United States Patent [19]
Hirono et al.

[11] Patent Number: 5,608,211
[45] Date of Patent: Mar. 4, 1997

[54] OPTICAL DISPLACEMENT DETECTOR FOR DETERMINING AN OBJECT PROFILE

[75] Inventors: Atsuyuki Hirono, Kobe; Takayasu Ito, Yao; Takeshi Hashimoto, Nishinomiya, all of Japan

[73] Assignee: Matsushita Electric Works, Ltd., Osaka, Japan

[21] Appl. No.: 361,374

[22] Filed: Dec. 22, 1994

[30] Foreign Application Priority Data

Dec. 22, 1993 [JP] Japan .................................. 5-325464
Oct. 5, 1994 [JP] Japan .................................. 6-241599

[51] Int. Cl.⁶ .................................................. H04N 1/22
[52] U.S. Cl. .............. 250/234; 250/559.23; 250/559.31; 356/376
[58] Field of Search ................ 250/559.22, 559.23, 250/559.29, 559.39, 559.4, 234, 559.31; 356/375, 376

[56] References Cited

U.S. PATENT DOCUMENTS

| | | | |
|---|---|---|---|
| 3,355,590 | 10/1964 | Bertram | 250/559.23 |
| 4,332,989 | 6/1982 | Nicolaisen . | |
| 4,577,142 | 3/1986 | Matsumiya . | |
| 4,676,649 | 6/1987 | Phillips . | |
| 4,806,777 | 2/1989 | Ulbers et al. | 250/559.22 |
| 4,864,147 | 9/1989 | Ikari . | |
| 4,924,598 | 5/1990 | Gruhler . | |
| 4,952,816 | 8/1990 | Dunning | 250/559.31 |
| 4,959,553 | 9/1990 | Yamada et al. | 250/559.22 |
| 5,124,524 | 6/1992 | Schuster et al. . | |
| 5,229,619 | 7/1993 | Van Amstel | 250/559.22 |
| 5,233,201 | 8/1993 | Cheng | 250/559.23 |
| 5,294,804 | 3/1994 | Kajimua | 356/376 |
| 5,424,836 | 6/1995 | Weise et al. | 356/376 |
| 5,451,777 | 9/1995 | Blake et al. | 250/234 |

FOREIGN PATENT DOCUMENTS

| | | |
|---|---|---|
| 1043375 | 9/1966 | United Kingdom . |
| 2092776 | 8/1982 | United Kingdom . |

OTHER PUBLICATIONS

Steuerungssystem für Montageroboter, "Control System for an Assembly Robot", D. Classe, Erlangen, Automatisierungstechnik at, 34, Jahrgang Oct. 1986, pp. 381–387.

Primary Examiner—Stephone Allen
Attorney, Agent, or Firm—Nikaido, Marmelstein, Murray & Oram LLP

[57] ABSTRACT

In an optically scanning displacement detector for determination of an object's profile, the detector comprises a light projecting unit for radiating a light beam on the object, a light receiving unit for receiving a reflected light beam from the object to output an object position signal, and a distance determining unit for determining a distance between the projecting unit and the object in accordance with the object position signal. The light projecting and receiving units are mounted in a carrier which is movably supported to a frame. The carrier can be moved in a scanning direction to scan the light beam across the object by the use of an electric motor such as a voice-coil linear motor. Since the present detector does not use a scanning mirror for deviating the light beam, the object's profile can be determined with improved accuracy of measurement, while preventing a formation of dead space in which the light beam can not be radiated during the scanning operation. The detector also comprises a carrier position sensor for determining a position of the carrier in the scanning direction, and a safeguard unit for sensing unusual operation of the motor to generate a stop signal, and stopping a supply of electric current to the motor in response to the stop signal.

52 Claims, 26 Drawing Sheets

OPTICAL DISPLACEMENT DETECTOR FOR DETERMINING AN OBJECT PROFILE

BACKGROUND OF THE INVENTION

1. Field of the Invention

The present invention relates to an optically scanning displacement detector for determination of an object profile, and more particularly to such an optically scanning displacement detector utilizing a scanning unit for moving, in a scanning direction, a set of a light projecting unit for radiating a light beam on an object and a light receiving unit for receiving a reflected light from the object, to scan the light beam across the object.

2. Disclosure of the Prior Art

For determining an object profile by means of an optical measurement, U.S. Pat. No. 4,864,147 discloses an optically scanning displacement sensor 1P utilizing a triangulation. As shown in FIG. 35, the sensor 1P comprises a light projecting unit 2P for radiating a light beam on an object OBJ to be detected, a light receiving unit 3P for receiving diffuse reflected light from the object to generate an output position signal, and a distance determining unit (not shown) for determining a perpendicular distance between the object OBJ and the projecting unit 2P in accordance with the position signal. The light projecting unit 2P is provided with a light emitting element 10P such as a semiconductor laser, light emitting diode or the like, a first focusing lens 11P, and a scanning mirror 12P for deviating the light beam provided from the light emitting element 10P to scan the light beam across the object OBJ. The light receiving unit 3P is provided with a second focusing lens 21P and one-dimensional position detecting element 22P such as PSD.

However, there cause the following problems in case of scanning the light beam across the object OBJ having a cross-section shown in FIG. 36 by the use of the scanning mirror 12P.

1) Since the light beam is deviated at a deviating point M on the scanning mirror 12P to scan the light beam across the object OBJ the deviated light beam is incident on the object's surface at an inclined angle except for a specific position R of the object's surface positioned just below the deviating point M. Therefore, there is a first problem of forming a dead space D within a scanning range, in which the deviated light beam can not be radiated, as shown in FIG. 36. As an incident angle $\phi 1$ of the deviated light beam to the object's surface is smaller, the formation of dead space D is increased. As a result, accurate determination of the object's profile would be prevented by the dead space D.

2) When there are two-different positions (R and P1) to be detected on the object's surface, which are spaced away from the scanning mirror 12P by a perpendicular distance d, as shown in FIG. 36, there causes a second problem that an area of a first light spot formed when the light beam is incident on the position P1 at an inclined angle $\phi 2$ is different from the area of a second light spot formed when the light beam is incident on the position R at a right angle $\phi 3$. The area difference between the first and second light spots is increased in proportion to a difference between the angles $\phi 2$ and $\phi 3$. Therefore, as a scanning range is increased, it would be difficult to determine the object's profile with a constant accuracy of measurement.

3) The light receiving unit 3P uses such one-dimensional position detecting element 22P on which the reflected light makes a condensed light spot through the second focusing lens 21P. The detecting element 20P is disposed in the receiving unit 3P such the condensed light spot can be moved in a longitudinal direction Q of the detecting element 22P from a position S1 to a position S3 as a distance between the light projecting unit 2P and the object OBJ varies from a distance d1 to a distance d3, as shown in FIG. 37. When the light beam is scanned in a scanning direction across the object by the scanning mirror 12P, the condensed light spot moves on the detecting element 22P in a perpendicular direction to the longitudinal direction Q. Therefore, there is a third problem that a maximum scanning range of the displacement sensor 1P is limited by an effective width of the detecting element 22P.

SUMMARY OF THE INVENTION

For improving the above problems, a primary object of the present invention is to provide an optically scanning displacement detector for determination of an object's profile, which is characterized by the use of a scanning unit for moving a carrier mounting light projecting and receiving units in a scanning direction to scan a light beam provided from the light projecting unit across the object. That is, the displacement detector comprises the light projecting unit, the light receiving unit for receiving a reflected light from the object to output an object position signal, a distance determining unit for determining a distance between the object and the light projecting unit in accordance with the position signal, and the scanning unit of the present invention. The carrier is movably supported to a frame. The scanning unit uses an electric motor for moving the carrier in the scanning direction. By the use of the scanning unit, the following advantages can be obtained in the present invention.

1) The scanning unit can provide a parallel movement of the light beam in the scanning direction to scan the light beam across the object. In particular, when the light beam is radiated from a substantially perpendicular direction to the object, a formation of the dead space can be effectively prevented.

2) Since the carrier mounting the light projecting and receiving units is moved in the scanning direction to scan the light beam across the object, it is possible to perform a scanning operation in spite of size of the object. That is, the scanning unit can provide a wide scanning range.

3) When there are two-different positions to be detected on a flat surface of the object which are spaced away from the carrier by a distance, an area of a first light spot formed when the light beam is incident on one of the positions is the substantially same as the area of a second light spot formed when the light beam is incident on the other position. It means that the displacement detector can provide improved accuracy of measurement, as compared with the case of using a scanning mirror for deviating a light beam to scan the light beam across the object.

Thus, since a scanning of the light beam is performed by the scanning unit of the present invention without using such a scanning mirror, the displacement detector can determine the object's profile with the improved accuracy of measurement, while preventing the formation of the dead space.

In the present invention, it is preferred to use a voice-coil linear motor as the electric motor.

In the displacement detector of the present invention, since the carrier is moved in the scanning direction together with the light projecting and receiving units which are expensive and precision equipments, it is preferred that the displacement detector comprises a safeguard unit for sensing unusual operation of the motor to generate a stop signal, and stopping the scanning operation, e.g., by stopping to supply electric current to the motor in accordance with the stop signal. For example, the safeguard unit comprises a current monitor for monitoring electric current supplied to the motor, a comparator for generating the stop signal when a value of the current, or a differential value of the current with respect to time, exceeds a threshold value, and a breaker for stopping to supply the current to the motor in response to the stop signal. Therefore, it is possible to prevent a motor trouble caused by the supply of an excess amount of electric current to the motor. In particular, when the displacement detector has a carrier position sensor for measuring a position of the carrier in the scanning direction, it is preferred that the safeguard unit also comprises a comparator for generating the stop signal when the position of the carrier provided from the carrier position sensor exceeds a predetermined scanning range of the carrier.

In a preferred embodiment of the present invention, the carrier position sensor comprises a mirror mounted on the carrier, additional light projecting unit for radiating a sensor light beam in the scanning direction toward the mirror, additional light receiving unit for receiving a reflected light beam from the mirror to generate a carrier position signal, and a carrier position determining unit for determining the position of the carrier in accordance with the carrier position signal. The additional projecting unit and additional receiving unit are fixed to the frame.

It is also preferred that the displacement detector comprises an input unit for inputting scanning parameters, and a carrier control unit for controlling, in a feed-back manner, the motor in accordance with an error between a measured position of the carrier provided from the carrier position sensor and a scheduled position of the carrier determined by the scanning parameters, and differential values of the first and second orders of the measured position with respect to time, to thereby provide a precise scanning operation along the scanning parameters.

To prevent any uncontrollable motion of the carrier, which is caused by an inertial force of the carrier when a supply of electric power to the displacement detector is accidentally stopped during the scanning operation, it is preferred that the displacement detector comprises a carrier catching unit. For example, the catching unit is formed with a rugged member having a plurality of triangular notches arranged in the scanning direction, and a triangular hook provided on the carrier. When the supply of electric power is stopped, the notches are engaged to the hook to hold the carrier at a catching position on the rugged member. Therefore, it is possible to prevent an accidental collision of the carrier with the frame. In this case, it is also preferred that the displacement detector comprises a carrier position reset unit for moving the carrier from the catching position to a scanning starting position at a relatively low speed, when the supply of electric power to the displacement detector is started again.

The above and the other objects, characteristic features and advantages of the present invention will become apparent to those skilled in the art as disclosure is made in the following description of a preferred embodiment of the invention, as illustrated in the accompanying drawings.

DESCRIPTION OF THE PREFERRED EMBODIMENTS

Each of optically scanning displacement detectors explained in the following embodiments applies a triangulation method to determine a distance between a light projecting unit for radiating a light beam and an object to be detected. However, it is also possible to apply a heterodyne interference method, which is characterized by dividing the light beam to an object light beam directed to the object and a reference light beam, and determining the distance between the light projecting unit and the object in accordance with an interference between a reflected light from the object and the reference light followed a predetermined light pass. That is, a method utilizing a light beam directed to an object and a reflected light beam from the object to determine the distance can be adopted to the displacement detector of the present invention.

<First Embodiment>

Figure 1:
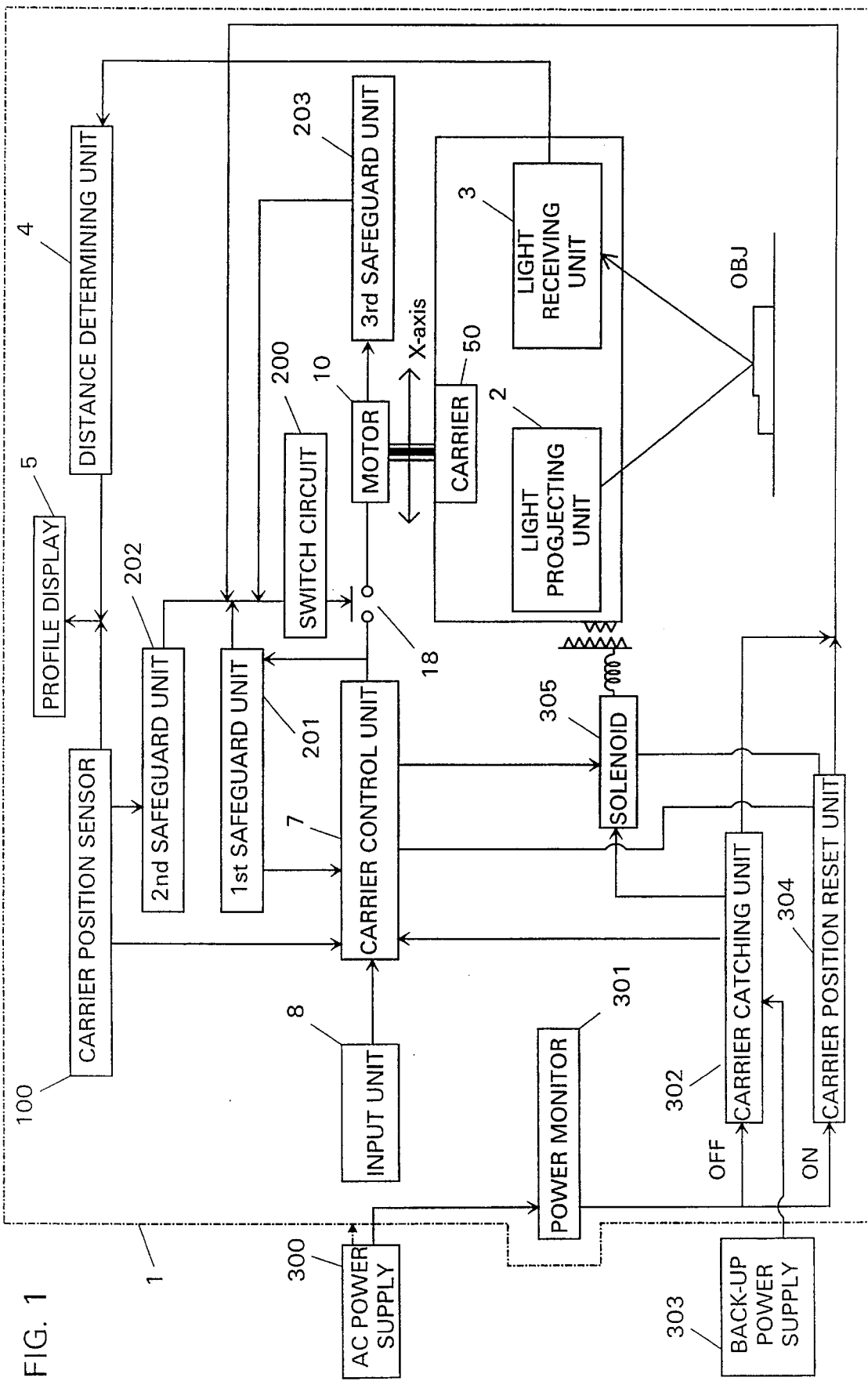
FIG. 1 is a signal processing unit of an optically scanning displacement detector of a first embodiment of the present invention.

Referring to FIGS. 1 to 19, an optically scanning displacement detector 1 of the first embodiment of the present invention is explained in detail. As shown in FIG. 1, the displacement detector 1 comprises a light projecting unit 2 for radiating a light beam to an object OBJ to be detected, a light receiving unit 3 for receiving a reflected light from the object to output an object position signal, a distance determining unit 4 for determining a distance between the object OBJ and the projecting unit 2 in accordance with the position signal, a carrier 50 mounting the projecting and receiving units (2 and 3), and a voice-coil linear motor 10 for moving the carrier 50 in a scanning direction to scan the light beam across the object OBJ.

Figure 2:
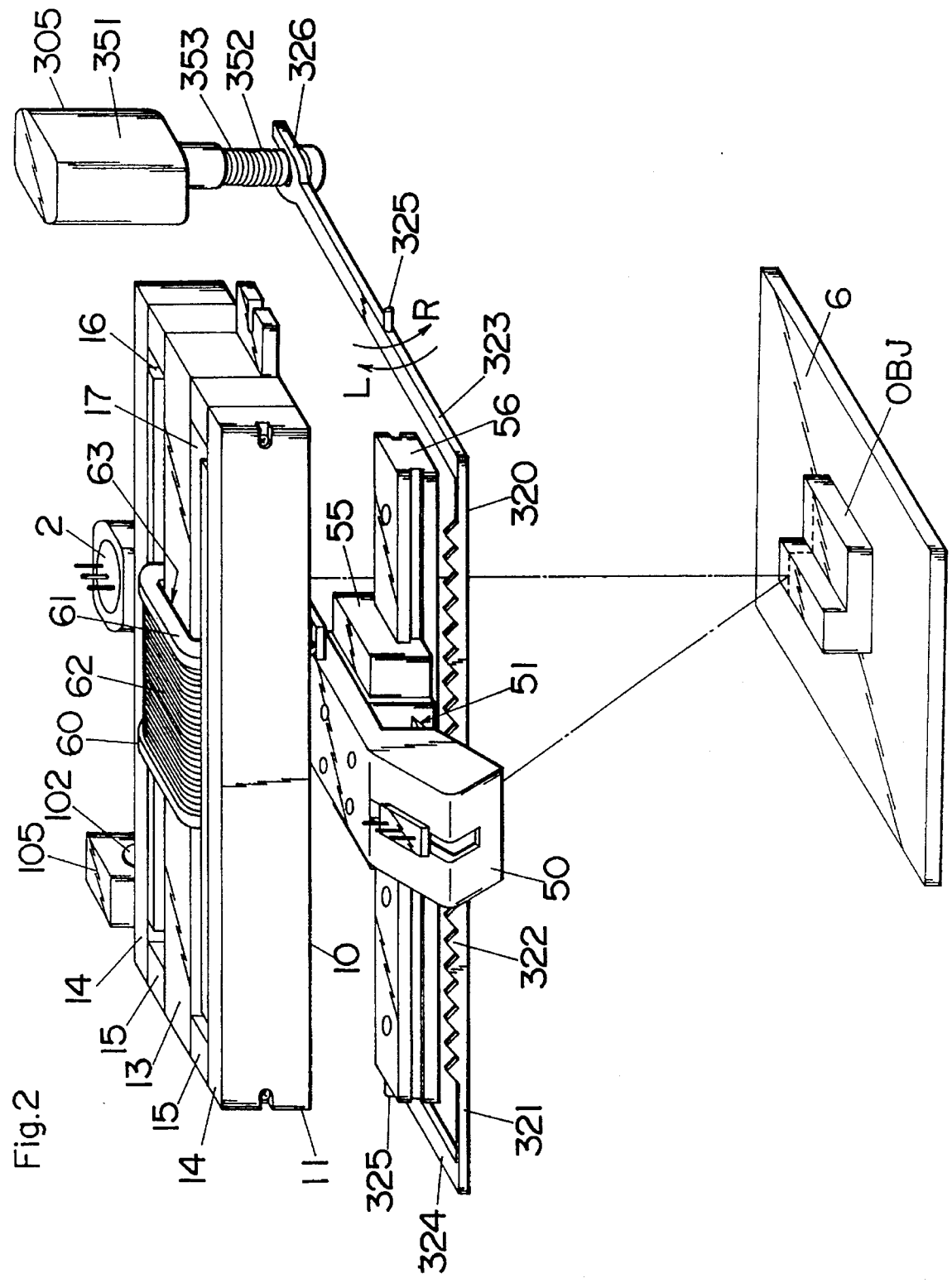
FIG. 2 is a perspective view of the displacement detector.
Figure 3:
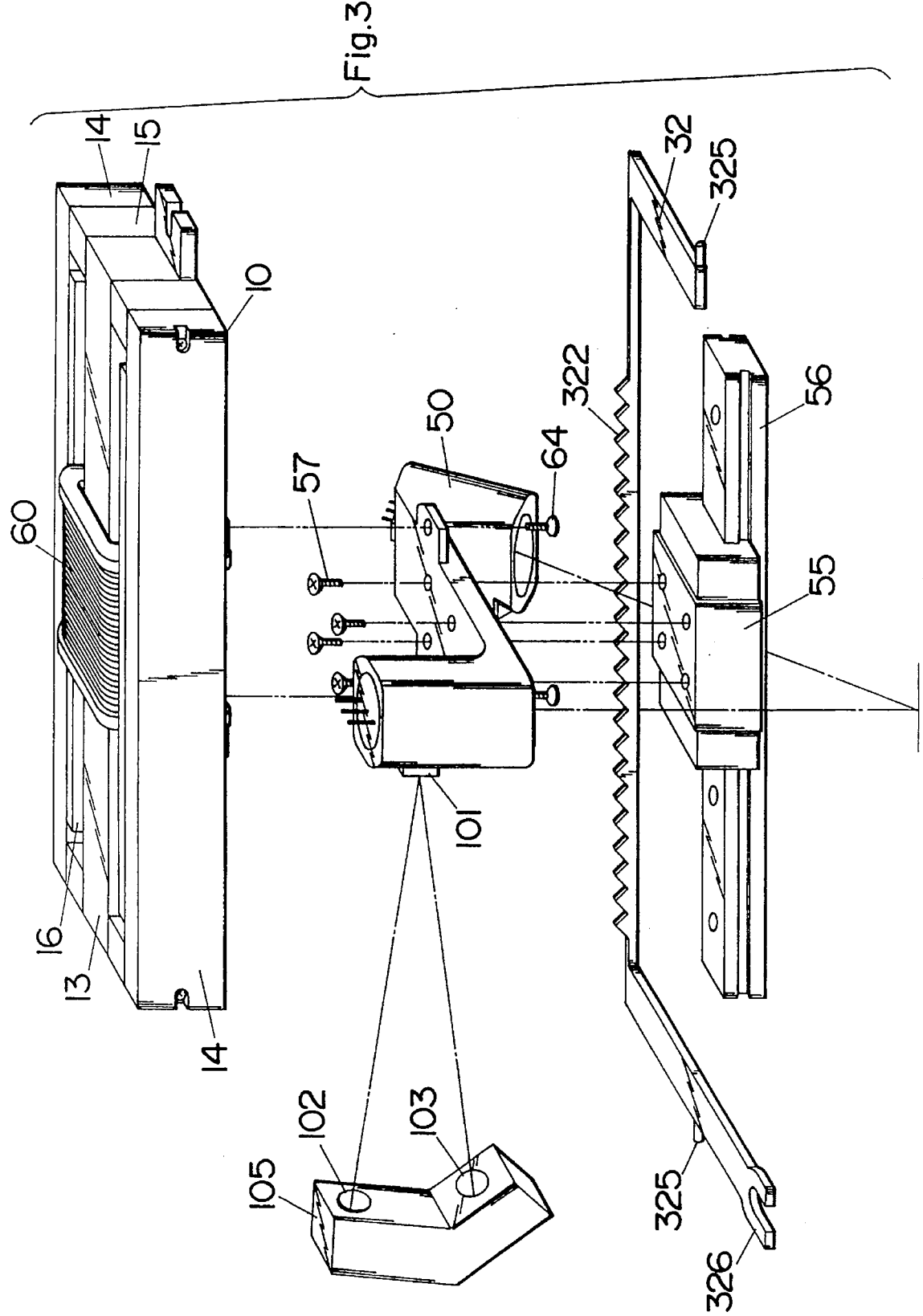
FIG. 3 is an exploded perspective view of the displacement detector.

The linear motor 10 is formed with a stationary frame 11 and a movable coil 60 movably supported to the stationary frame 11. The stationary frame 11 is provided with a center yoke 13, a pair of side yokes 14, spacers 15, and two permanent plate magnets 16. The center yoke 13 is disposed between the side yokes 14 such that a longitudinal axis of the center yoke 13 is in a parallel relation with the longitudinal axes of the side yokes 14. The center yokes 13 is spaced away from the side yokes 14 by the spacers 15 in such a manner as to form a pair of traveling spaces 17 between the center yoke 13 and side yokes 14 for allowing the movable coil 60 to move in the longitudinal direction of the center yoke 13, as shown in FIGS. 2 and 3. The movable coil 60 is formed with a bobbin 61 having a number of turns of wire 62. The movable coil 60 is movably supported to the stationary frame 11 such that the center yoke 13 passes through a through-hole 63 of the bobbin 61. A cross-sectional area of the center yoke 13, which is taken along a line perpendicular to the longitudinal axis thereof, is twice as large as the cross-sectional area of the side yoke 14. Each of the plate magnets 16 is fixed on a surface of the side yoke 14 which is in a face-to-face relation with the center yoke 13. Magnetic poles of the plate magnet 16 are on a surface thereof contacting with the side yoke 14 and a surface thereof opposed to the center yoke 13, respectively. The surfaces of the magnets 16 opposed to the center yoke 13 are the same magnetic pole. The bobbin 61 is made of aluminum or a synthetic resin. When the bobbin 61 is made of aluminum, an insulation film is formed on the bobbin 61 to electrically insulate from the wire 62, and also a slit (not shown) is formed in the bobbin 61 to prevent the occurrence of eddy current of the movable coil 60.

Figure 4:
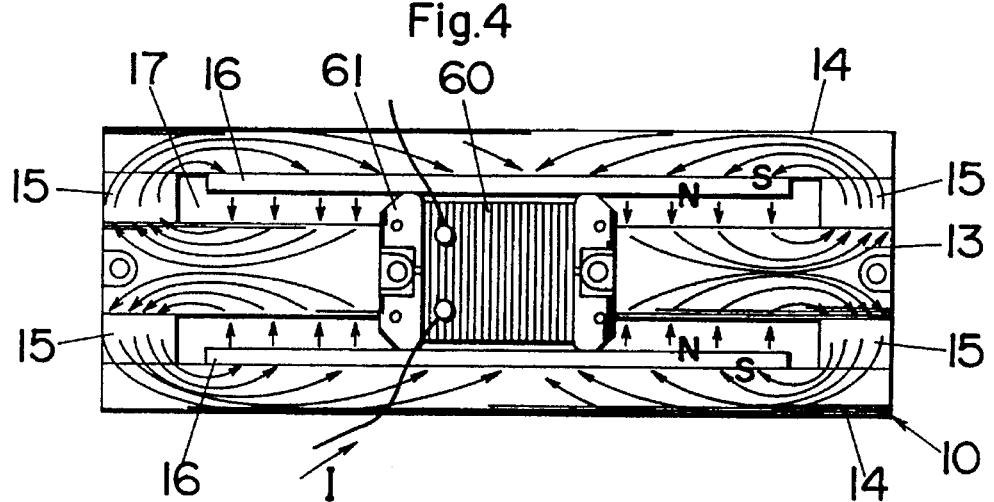
FIG. 4 illustrates a magnetic field of a voice-coil linear motor of the displacement detector.

For example, when the surfaces of the plate magnets 16 opposed to the center yoke 13 are the north pole (N), magnetic lines of force are formed around the plate magnets 16, as shown in FIG. 4. The magnetic lines of force pass through the movable coil 60 between the center yoke 13 and the plate magnets 16. When a direct current is supplied to the movable coil 60, the movable coil 60 receives a force F, which is expressed by the following equation:

$$F = B \times I \times L_w$$

wherein I is a value of electric current, B is a magnetic flux density, and Lw is a length of the wire 62 of the movable coil 60. The movable coil 60 can be moved in the longitudinal direction of the center yoke 13 by the force F. A traveling direction of the movable coil 60 can be reversed by switching a direction of electric current supplied thereto.

The carrier 50 mounting the light projecting and receiving units (2 and 3) is fixed to the movable coil 60 by the use of screws 64. The carrier 50 is also fixed to a slider 55 by the use of screws 57. The slider 55 is slidably engaged to a guide rail 56 extending parallel to the center yoke 13. In place of the slider 55 and guide rail 56, it is possible to use a linear ball bearing, linear roller bearing or the like.

Figure 5:
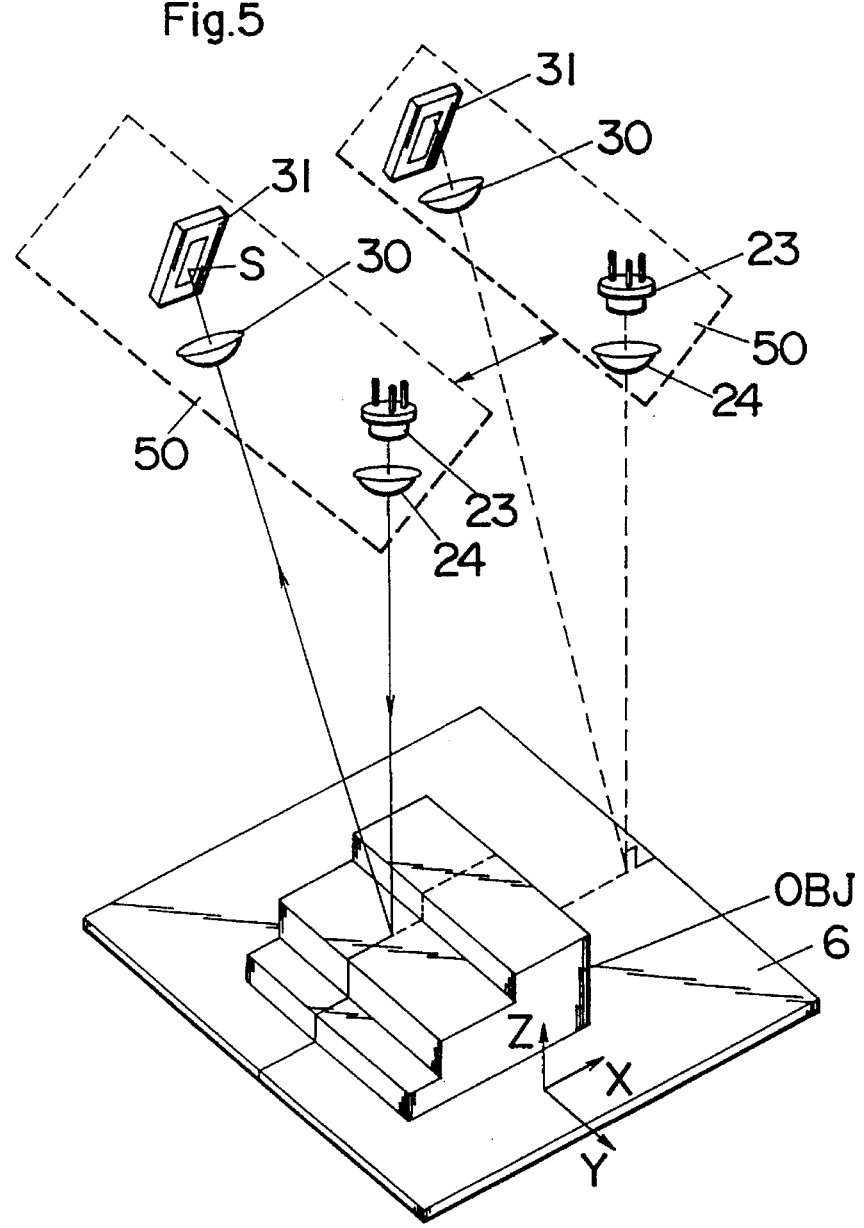
FIG. 5 is a perspective view of illustrating a scanning mechanism of light projecting and receiving units of the present invention.
Figure 6:
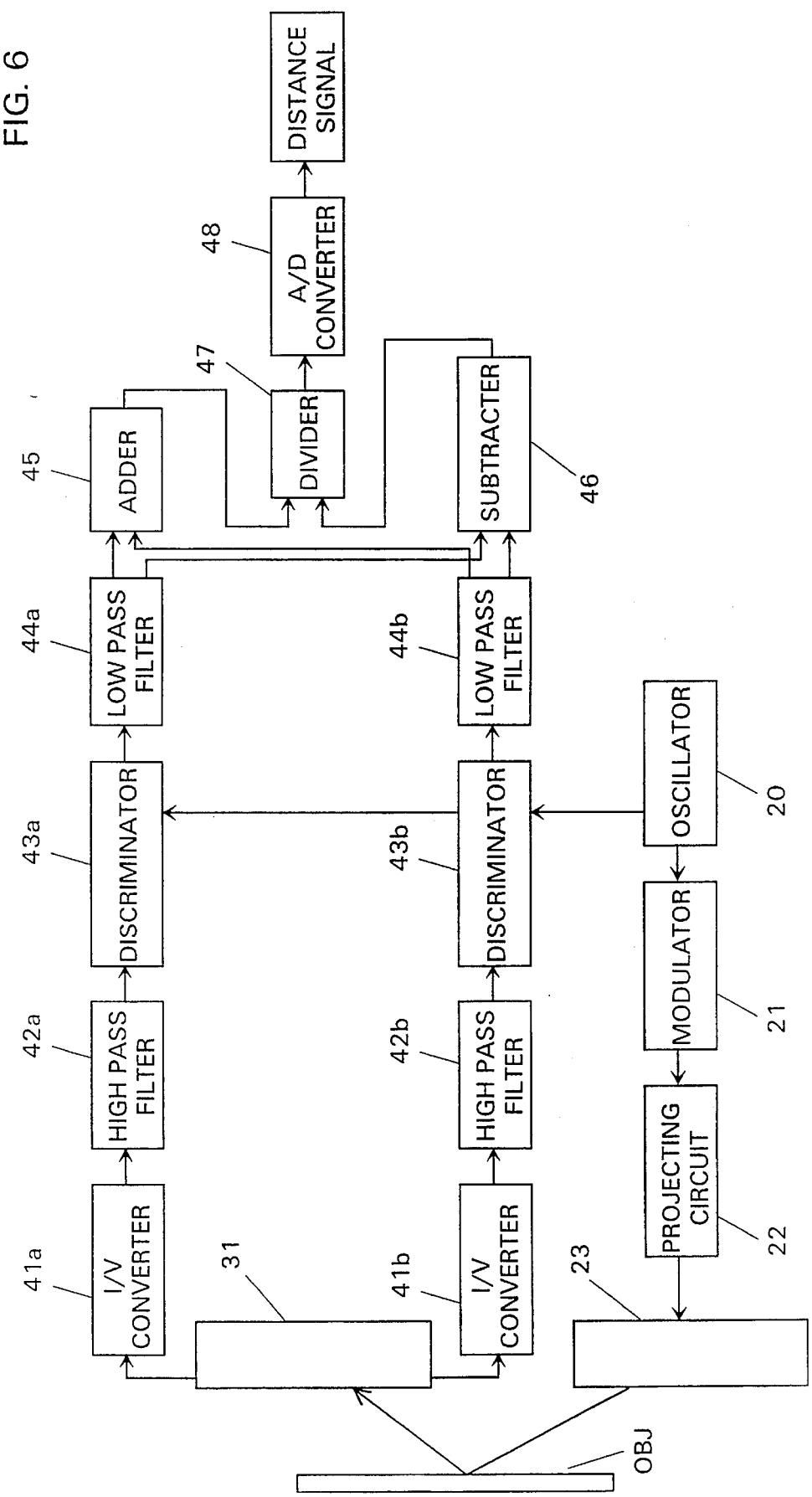
FIG. 6 is a signal processing unit employed in the displacement detector.

The light projecting unit 2 comprises a light emitting element 23 such as a semiconductor laser, luminescent semiconductor diode or the like, an oscillator 20 for providing a clock pulse, a modulator 21 for generating a modulation signal in response to the clock pulse, and a projecting circuit 22 for changing the modulation signal to a driving signal for projecting the light beam from the emitting element 23, as shown in FIG. 6. A timing of projecting the light beam is determined in accordance with the clock pulse provided from the oscillator 20. The light beam is radiated from a substantially perpendicular direction to a stationary table 6 used for placing the object OBJ through a first focusing lens 24, as shown in FIG. 5. In this embodiment, a rectangular coordinate system are defined such that X and Y axes are on the table 6.

In the light receiving unit 3, diffusion-reflected light back from the object OBJ is condensed by a second focusing lens 30 to form a condensed light spot S on a light receiving element 31 such as PSD. The receiving element 31 outputs a pair of electric current signals Ia and Ib indicative of the position of the condensed light spot S. In the distance determining unit 4, the electric current signals are converted to electric voltage signals Va and Vb by I/V converters (41a and 41b). The electric voltage signals are provided, through high pass filters (42a and 42b), to discriminators (43a and 43b) for discriminating in synchronism with the clock pulse from the oscillator 20. As shown in FIG. 6, the voltage signals from the discriminators (43a and 43b) are provided, through low pass filters (44a and 44b), to an adder 45 and subtracter 46 for performing such addition and subtraction as Va+Vb, Va–Vb, then to a divider 47 for performing the operation of (Va–Vb)/(Va+Vb), and finally to an A/D converter 48 to obtain the object position signal indicative of the distance between the object OBJ and the projecting unit 2.

Figure 7:
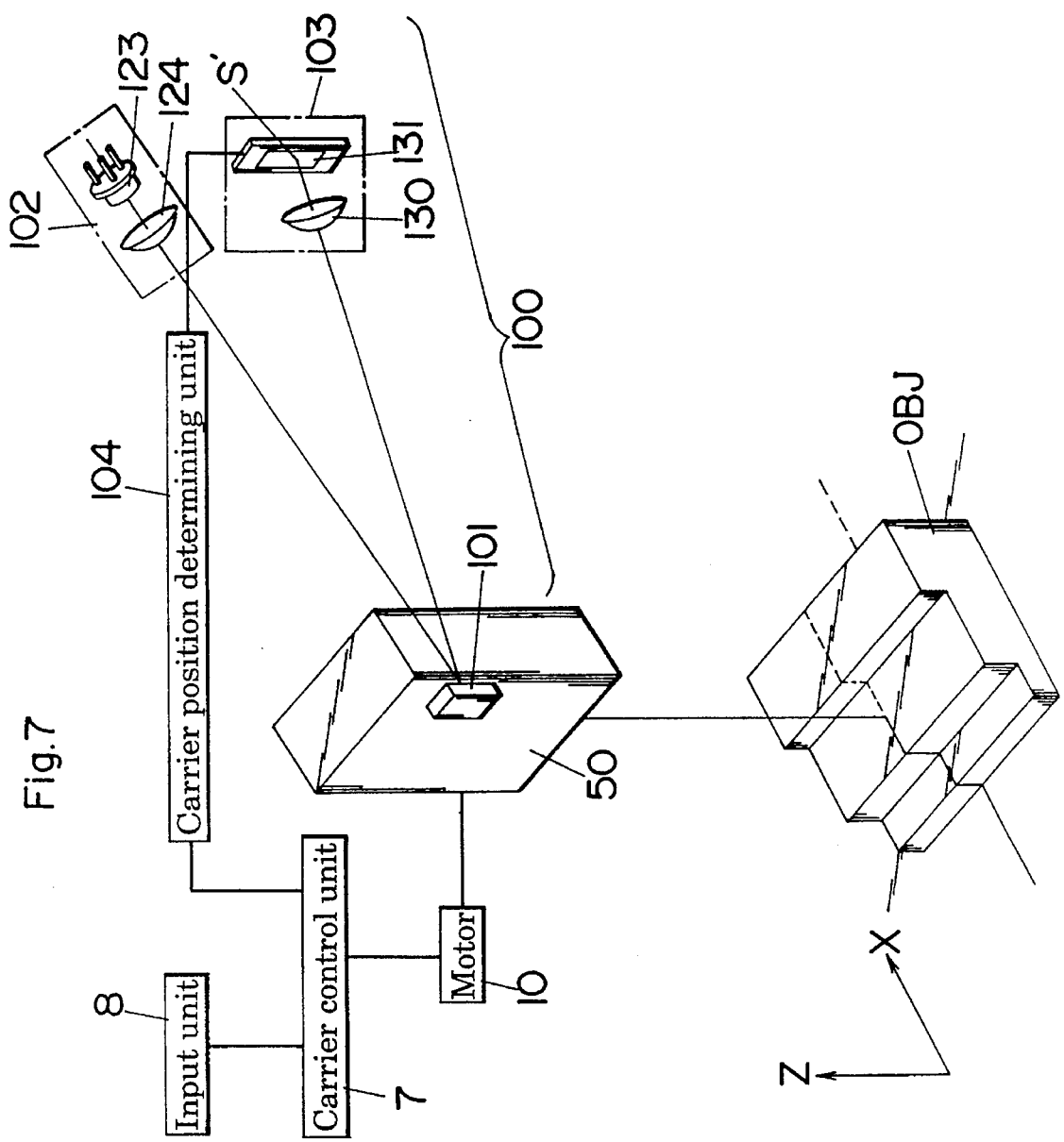
FIG. 7 is a perspective view illustrating a mechanism of a carrier position sensor of the present invention.

The displacement detector 1 also comprises a carrier position sensor 100 for measuring a position of the carrier 50 when the movable coil 60 is moved in the longitudinal direction (hereinafter referred to as a scanning direction) of the center yoke 13. As shown in FIG. 7, the carrier position sensor 100 comprises a mirror 101 mounted on the carrier 50, additional light projecting unit 102 for radiating a sensor light beam to the mirror 101, additional light receiving unit 103 for receiving a reflected light beam from the mirror 101 to generate a carrier position signal, and carrier position determining unit 104 for determining a position of the carrier 50 in the scanning direction in accordance with the carrier position signal. It is preferred that the mirror 101 is made of a ceramic material. The additional projecting unit 102 and additional receiving unit 103 are mounted on a stationary carrier 105 which is fixed to a support structure (not shown) of the displacement detector 1, as shown in FIG. 3.

Figure 8:
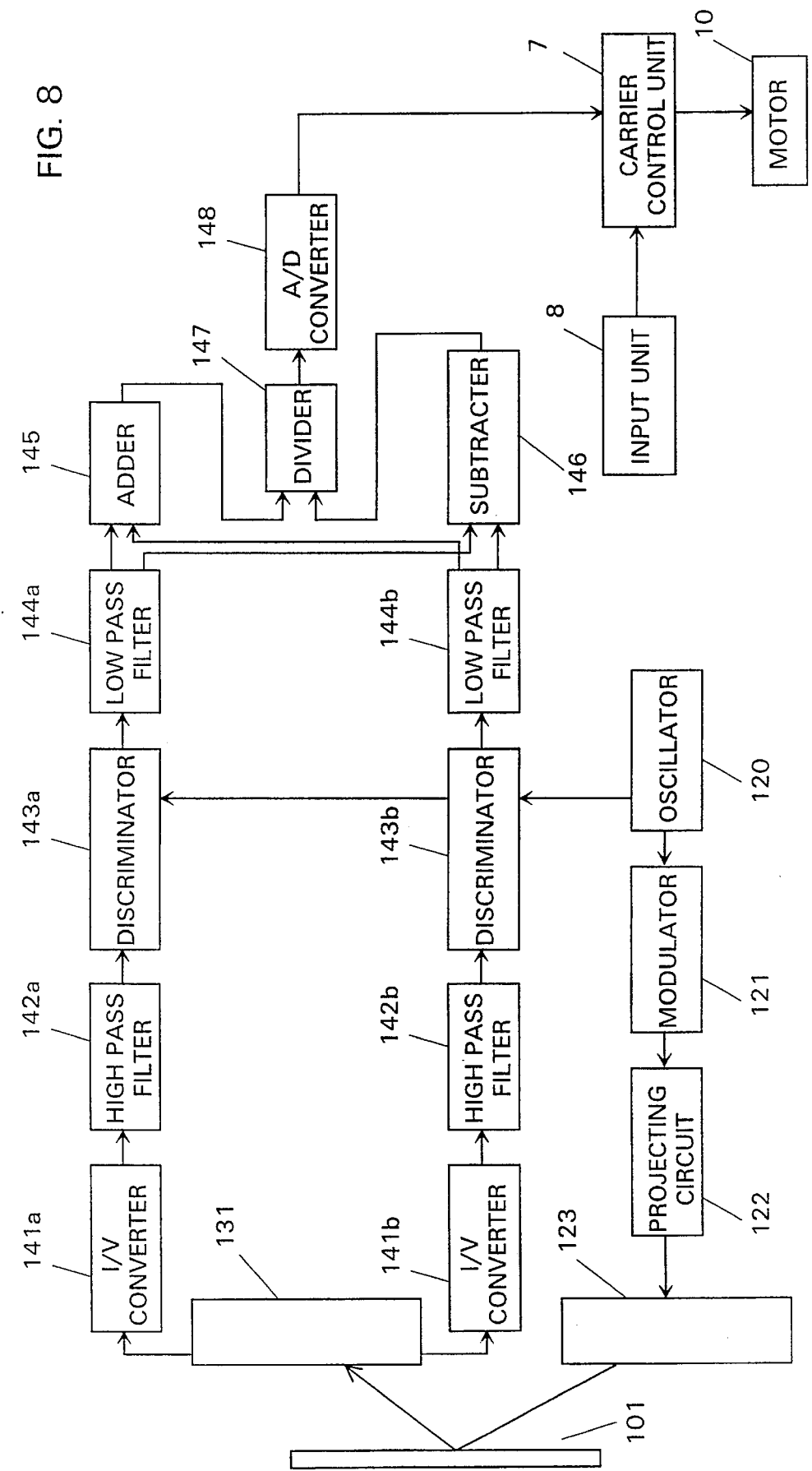
FIG. 8 is a signal processing unit employed in the position sensor.

The additional light projecting unit 102 comprises a light emitting element 123 such as a semiconductor laser, luminescent semiconductor diode or the like, an oscillator 120 for providing a clock pulse, a modulator 121 for generating a modulation signal in response to the clock pulse, and a projecting circuit 122 for changing the modulation signal to a driving signal for projecting the sensor light beam from the emitting element 123, as shown in FIG. 8. A timing of projecting the sensor light beam is determined in accordance with the clock pulse provided from the oscillator 120. The sensor light beam is radiated from the scanning direction to the mirror 101 through a first focusing lens 124, as shown in FIG. 7.

In the additional light receiving unit 103, a reflected light beam back from the mirror 101 is condensed by a second focusing lens 130 to form on a condensed light spot S' on a light receiving element 131 such as PSD. The receiving element 131 outputs a pair of electric current signals Ic and Id indicative of the position of the condensed light spot S'. In the carrier position determining unit 104, the electric current signals are converted to electric voltage signals Vc and Vd by I/V converters (141a and 141b). The electric voltage signals are provided, through high pass filters (142a and 142b), to discriminators (143a and 143b) for discriminating in synchronism with the clock pulse from the oscillator 120. As shown in FIG. 8, the voltage signals from the discriminators (143a and 143b) are provided, through low pass filters (144a and 144b), to an adder 145 and subtracter 146 for performing such addition and subtraction as Vc+Vd, Vc–Vd, then to a divider 147 for performing the operation of (Vc–Vd)/(Vc+Vd), and finally to an A/D converter 148 to obtain the carrier position signal. Therefore, it is possible to provide the object position signal corresponding to the carrier position signal. A measured profile of the object OBJ is displayed on a profile display 5 in accordance with the object position signal and the carrier position signal. In place of the above introduced arrangements of the mirror 101 and additional light projecting and receiving units 102 and 103, it is possible to fix the mirror 101 to the support structure, and mount the stationary carrier 105 on the carrier 50.

Figure 9:
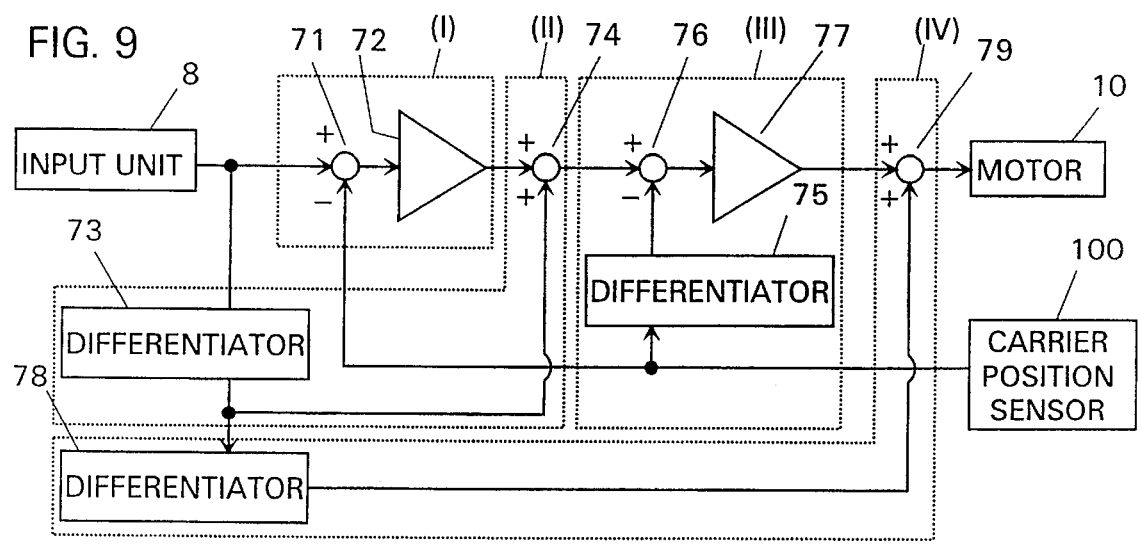
FIG. 9 is a block diagram of a carrier control unit of the displacement detector of the first embodiment.

A traveling of the carrier 50 in the scanning direction can be controlled by a carrier control unit 7 in accordance with the carrier position signal provided from the carrier position sensor 100. That is, the displacement detector 1 also comprises an input unit 8 for inputting scanning parameters, and the carrier control unit 7 for providing a precise scanning operation of the carrier 50 along the scanning parameters. The control unit is divided to four sub-control sections (I) to (IV), as shown in FIG. 9. The sub-control section (I) comprises a first subtracter 71 for providing a first error signal between the carrier position signal and a position command signal of the carrier provided from the input unit 8, and a first amplifier 72 for amplifying the first error signal. A triangular wave, rectangular wave or the like can be utilized as the carrier position and position command signals. The sub-control section (II) comprises a first differentiator 73 for providing a first differential value of the first order of the position command signal with respect to time, and a first adder 74 for providing a second error signal indicative of a sum of the first error signal from the first amplifier 72 and the first differential value of the position command signal. The sub-control section (III) comprises a second differentiator 75 for providing a first differential value of the first order of the carrier position signal with respect to time, a second subtracter 76 for providing a third error signal indicative of a difference between the second error signal and the first differential value of the carrier position signal, and a second amplifier 77 for amplifying the third error signal. The sub-control section (IV) comprises a third differentiator 78 for providing a second differential value of the second order of the position command signal with respect to time, and a second adder 79 for providing a control signal indicative of a sum of the second differential value and the third error signal from the second amplifier 77. Therefore, the linear motor 10 can be controlled in a feed-back manner within a reduced response time by supplying electric current corresponding to the control signal to the movable coil 60, to thereby provide the precise scanning operation of the carrier 50 along the scanning parameters.

Figure 10:
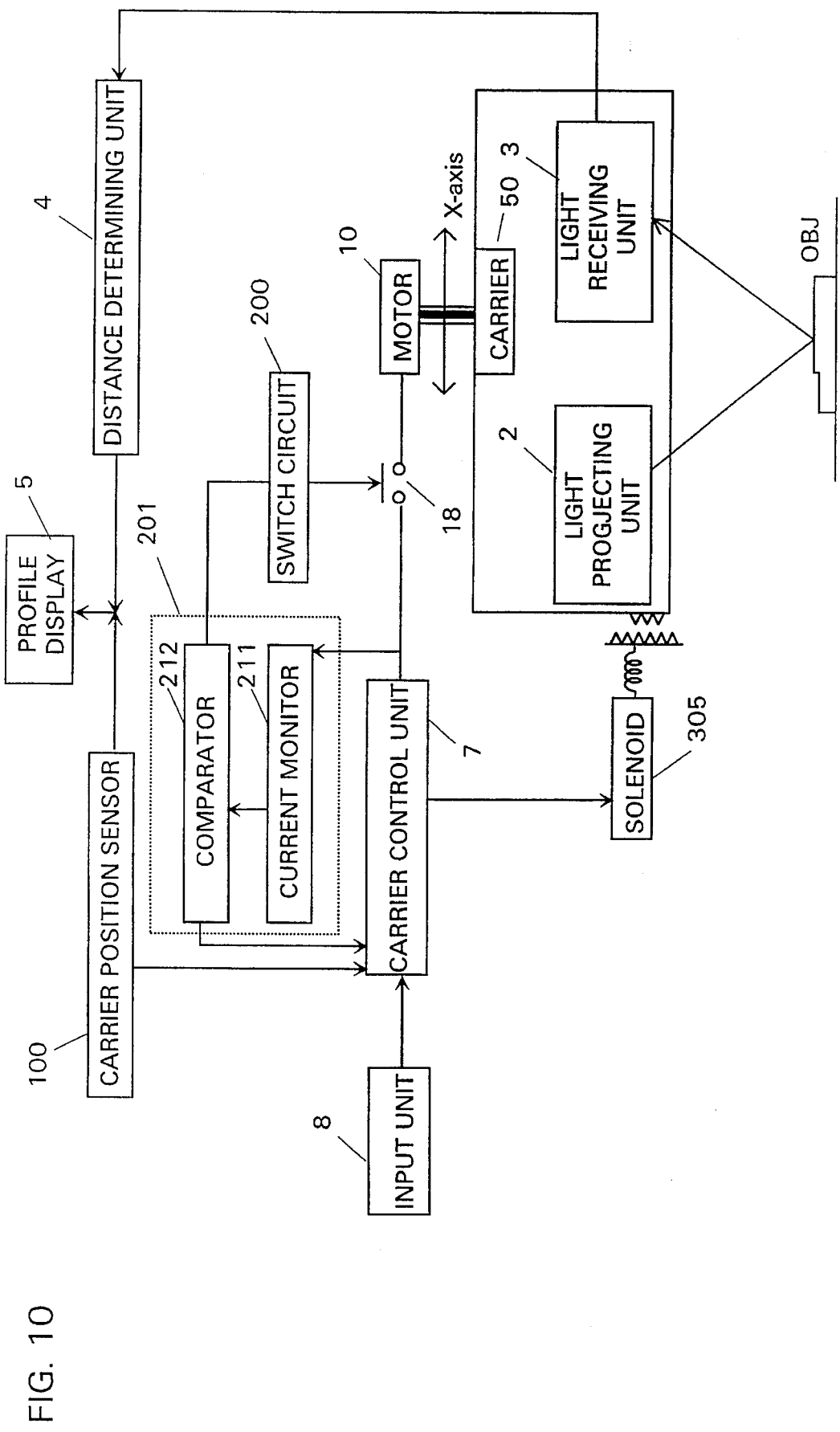
FIG. 10 is a block diagram of a first safeguard unit of the present invention.
Figure 11:
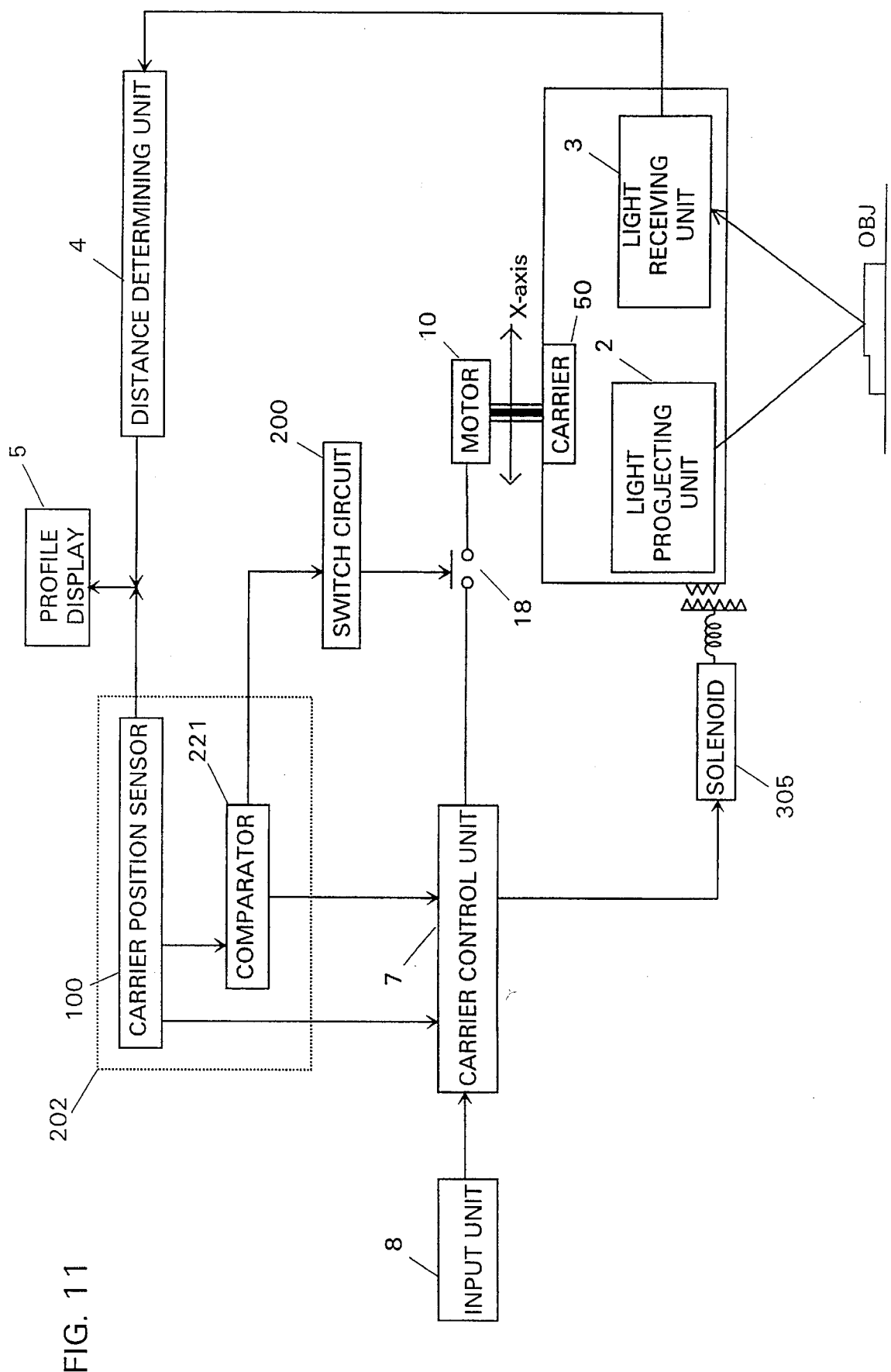
FIG. 11 is a block diagram of a second safeguard unit of the present invention.
Figure 12:
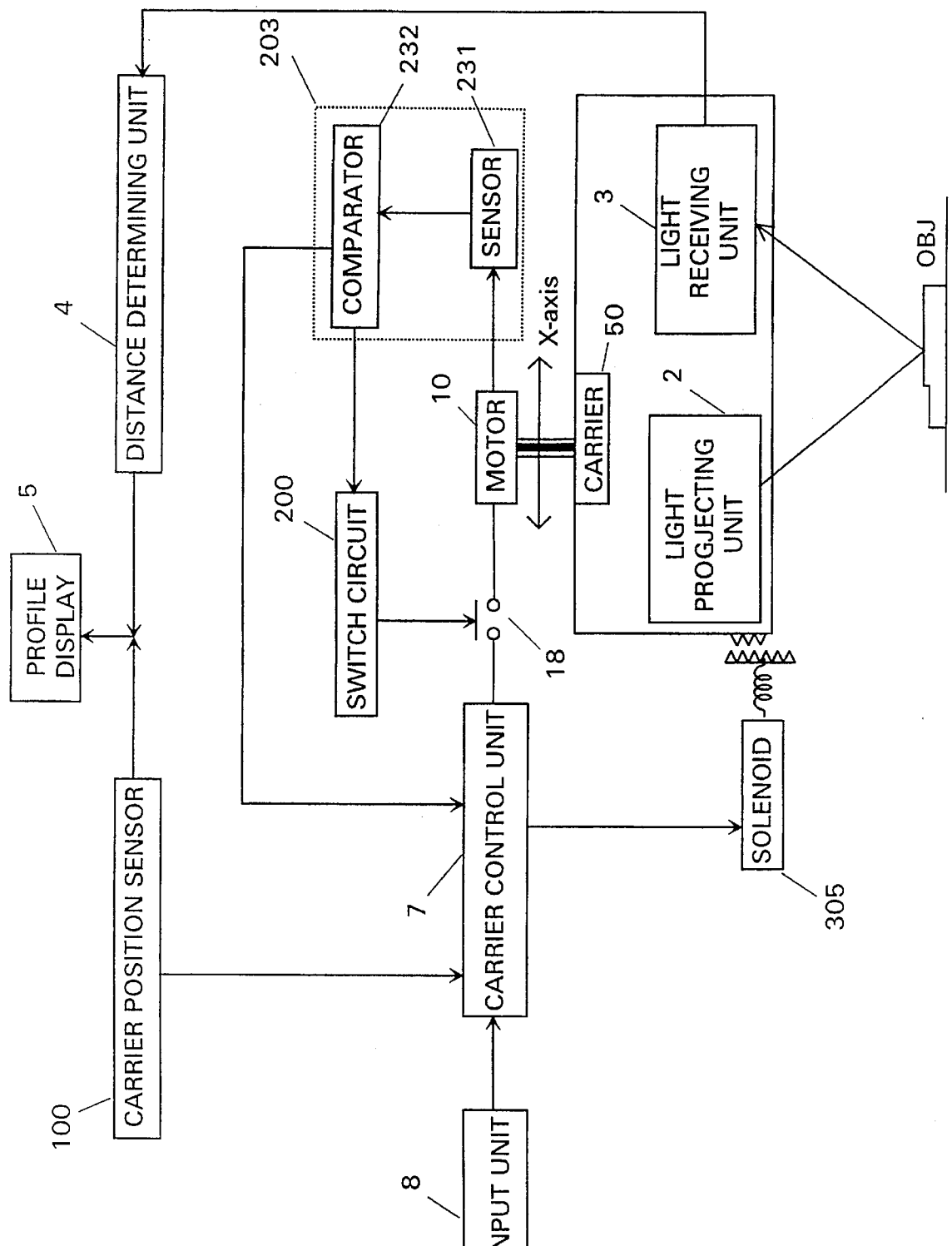
FIG. 12 is a block diagram of a third safeguard unit of the present invention.

The displacement detector 1 also comprises first to third safeguard units (201 to 203) for sensing unusual operation of the linear motor 10 to generate a stop signal, and stopping to supply electric current to the linear motor 10 in response to the stop signal. As shown in FIG. 10, the first safeguard unit 201 comprises a current monitor 211 for monitoring electric current supplied to the movable coil 60, a first comparator 212 for comparing a value of the current with a first threshold value, and generating a first stop signal when the value of the current exceeds the first threshold value, and a switch circuit 200 for turning off a motor switch 18 to stop a supply of the current to the movable coil 60 in response to the first stop signal. Therefore, it is possible to prevent a trouble of the linear motor 10 caused by a supply of an excess amount of the electric current to the movable coil 60. As shown in FIG. 11, the second safeguard unit 202 comprises a second comparator 221 for generating a second stop signal when the position of the carrier provided from the carrier position sensor 100 exceeds a predetermined scanning range of the carrier 50 which indicates a second threshold value. The supply of electric current to the movable coil 60 can be stopped by the switch circuit 200 in response to the second stop signal. As shown in FIG. 12, the third safeguard unit 203 comprises a sensor 231 for sensing a temperature of the movable coil 60, and a third comparator 232 for generating a third stop signal when a value of sensor current from the sensor 231 exceeds a third threshold value. The supply of electric current to the movable coil 60 can be stopped by the switch circuit 200 in response to the third stop signal. Therefore, it is possible to prevent an overheat of the movable coil 60 during the scanning operation.

Figure 13:
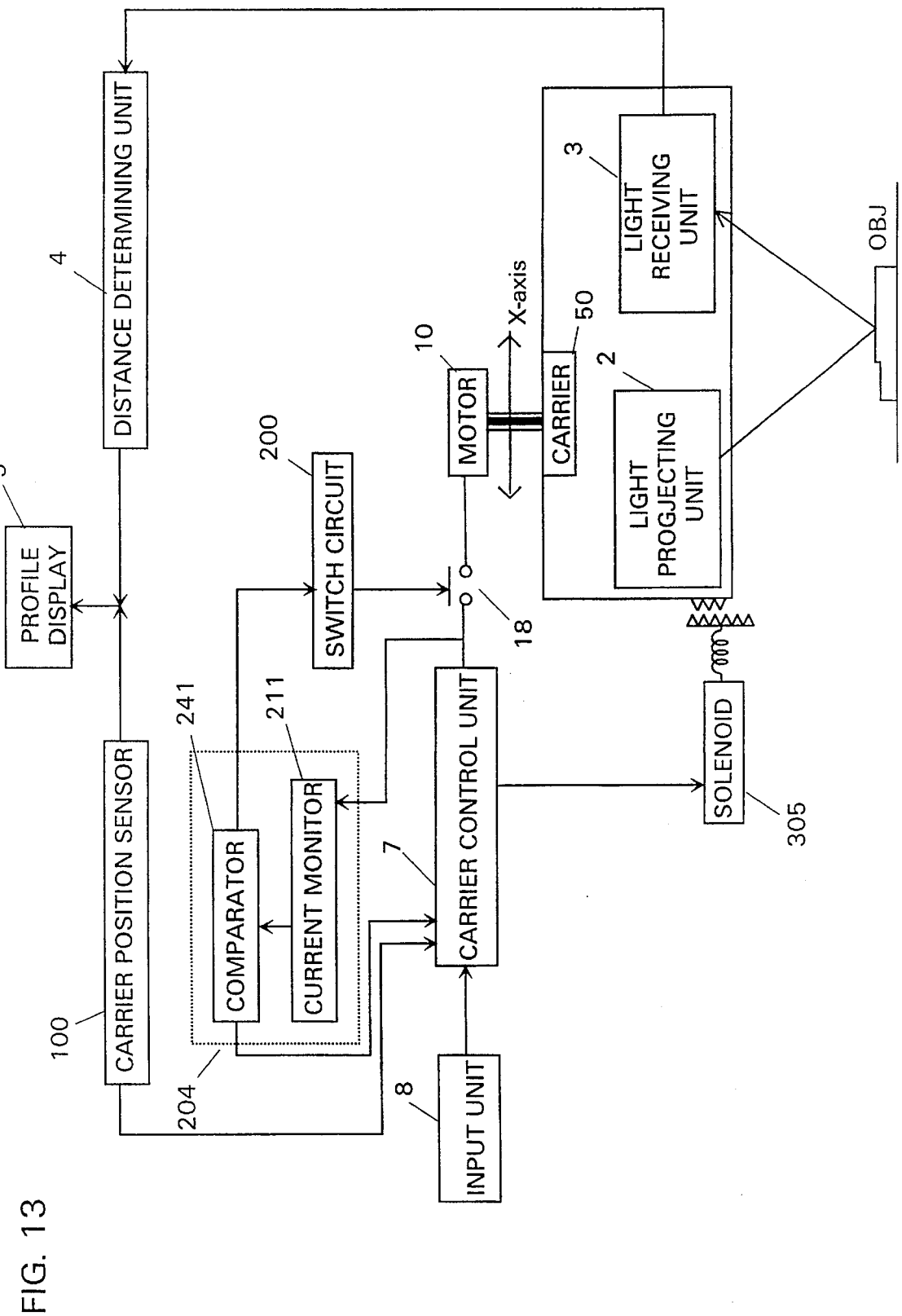
FIG. 13 is a block diagram of a fourth safeguard unit of the present invention.
Figure 14:
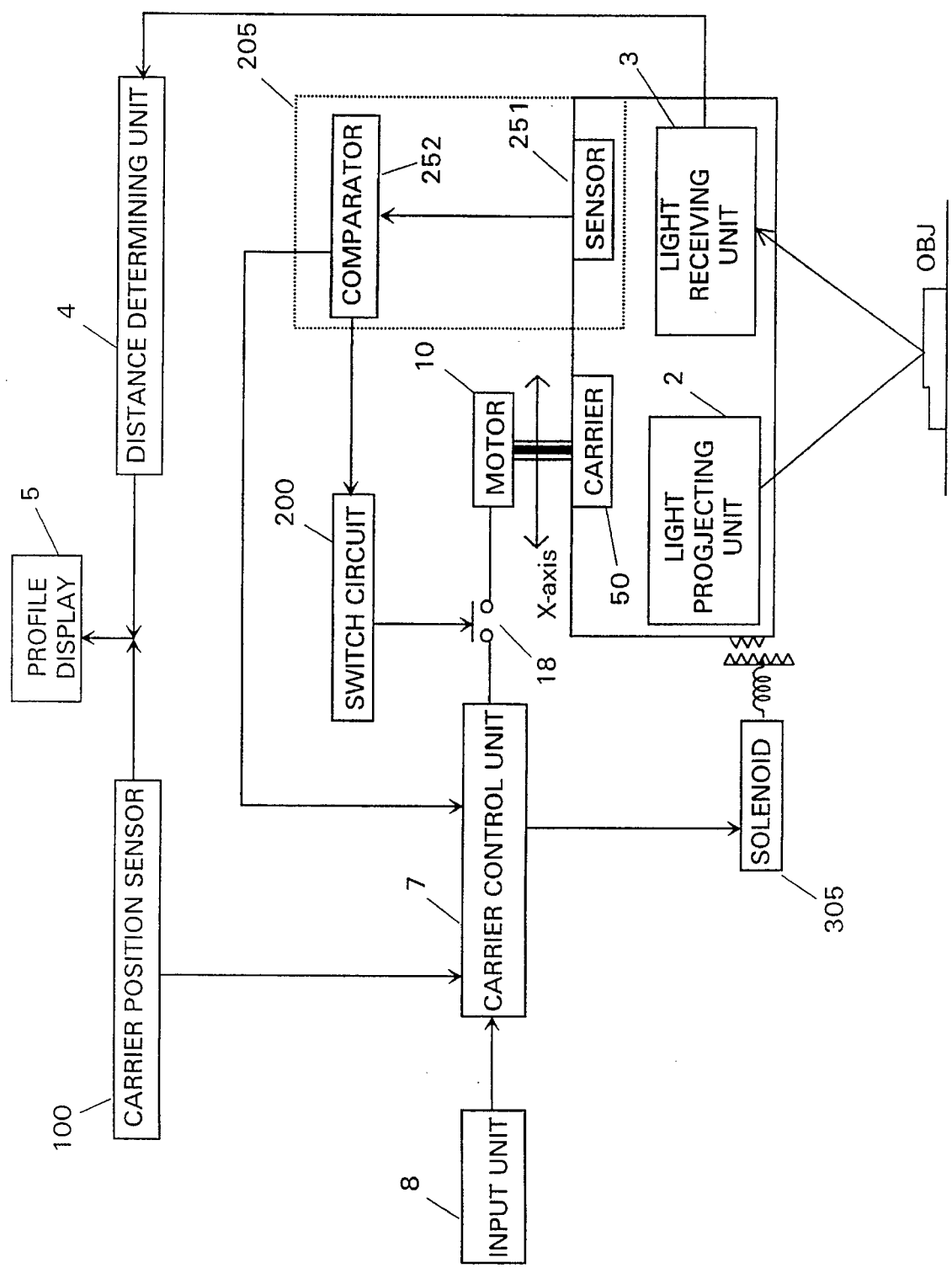
FIG. 14 is a block diagram of a fifth safeguard unit of the present invention.
Figure 15:
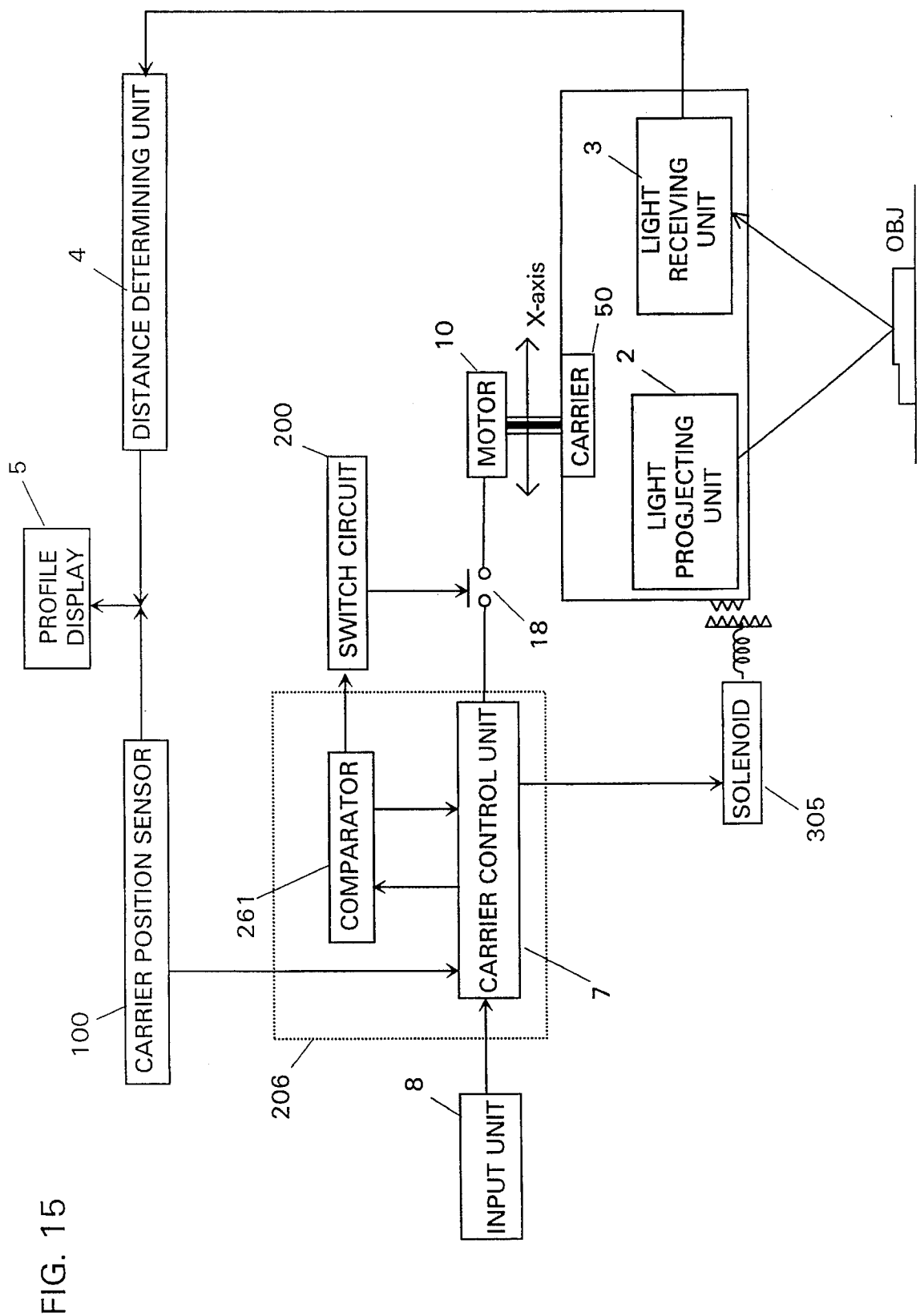
FIG. 15 is a block diagram of a sixth safeguard unit of the present invention.

If necessary, at least one of fourth to seventh safeguard units (204 to 206) may be also used to prevent an accidental breakage of the linear motor 10 or the light projecting and receiving units (2 and 3) mounted in the carrier. As shown in FIG. 13, the fourth safeguard unit 204 comprises a fourth comparator 241 for comparing a differential value of electric current provided from the current monitor 211 with respect to time with a fourth threshold value, and generating a fourth stop signal when the differential value exceeds the fourth threshold value. The supply of electric current to the movable coil 60 can be stopped by the switch circuit 200 in response to the fourth stop signal. As shown in FIG. 14, the fifth safeguard unit 205 comprises a shock sensor 251 for sensing vibrations or shock applied to the carrier 50, and a fifth comparator 252 for generating a fifth stop signal when a value of sensor current from the shock sensor 251 exceeds a fifth threshold value. The supply of electric current to the movable coil 60 can be stopped by the switch circuit 200 in response to the fifth stop Signal. As shown in FIG. 15, the sixth safeguard unit 206 comprises a sixth comparator 261 for comparing a value of the first error signal provided from the first subtracter 71 with a sixth threshold value, and generating a sixth stop signal when the value exceeds the sixth threshold value. The supply of electric current to the movable coil 60 can be stopped by the switch circuit 200 in response to the sixth stop signal. The seventh safeguard unit (not shown) comprises an auxiliary sensor for monitoring the position of the carrier 50 and generating a seventh stop signal when the carrier 50 moves beyond a limit position. The supply of electric current to the movable coil 60 can be stopped by the switch circuit 200 in response to the seventh stop signal. A photoelectric switch, photo-interrupter, a limit switch or the like may be used as the auxiliary sensor.

Figure 16:
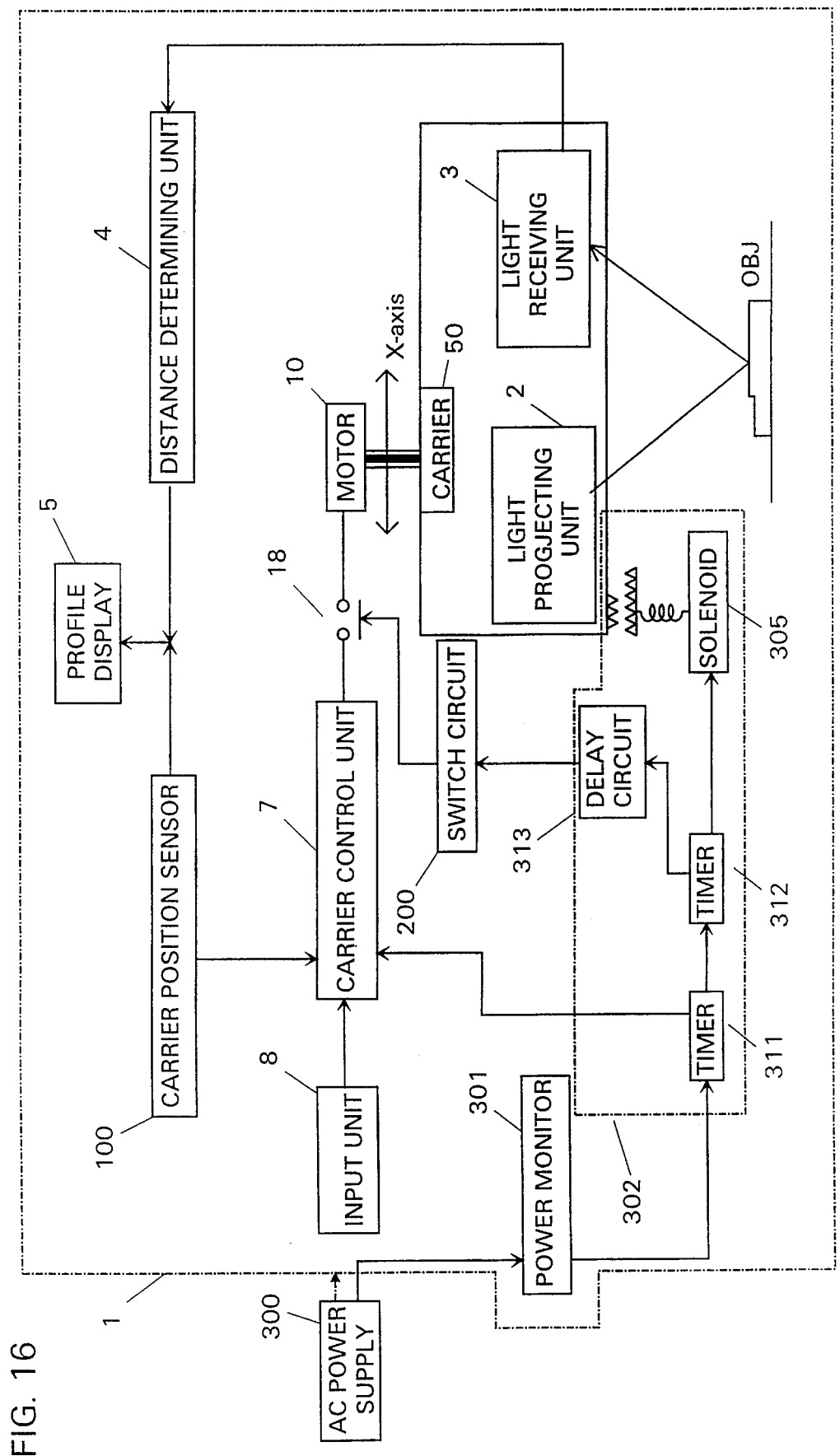
FIG. 16 is a block diagram of a carrier catching unit of the present invention.
Figure 17:
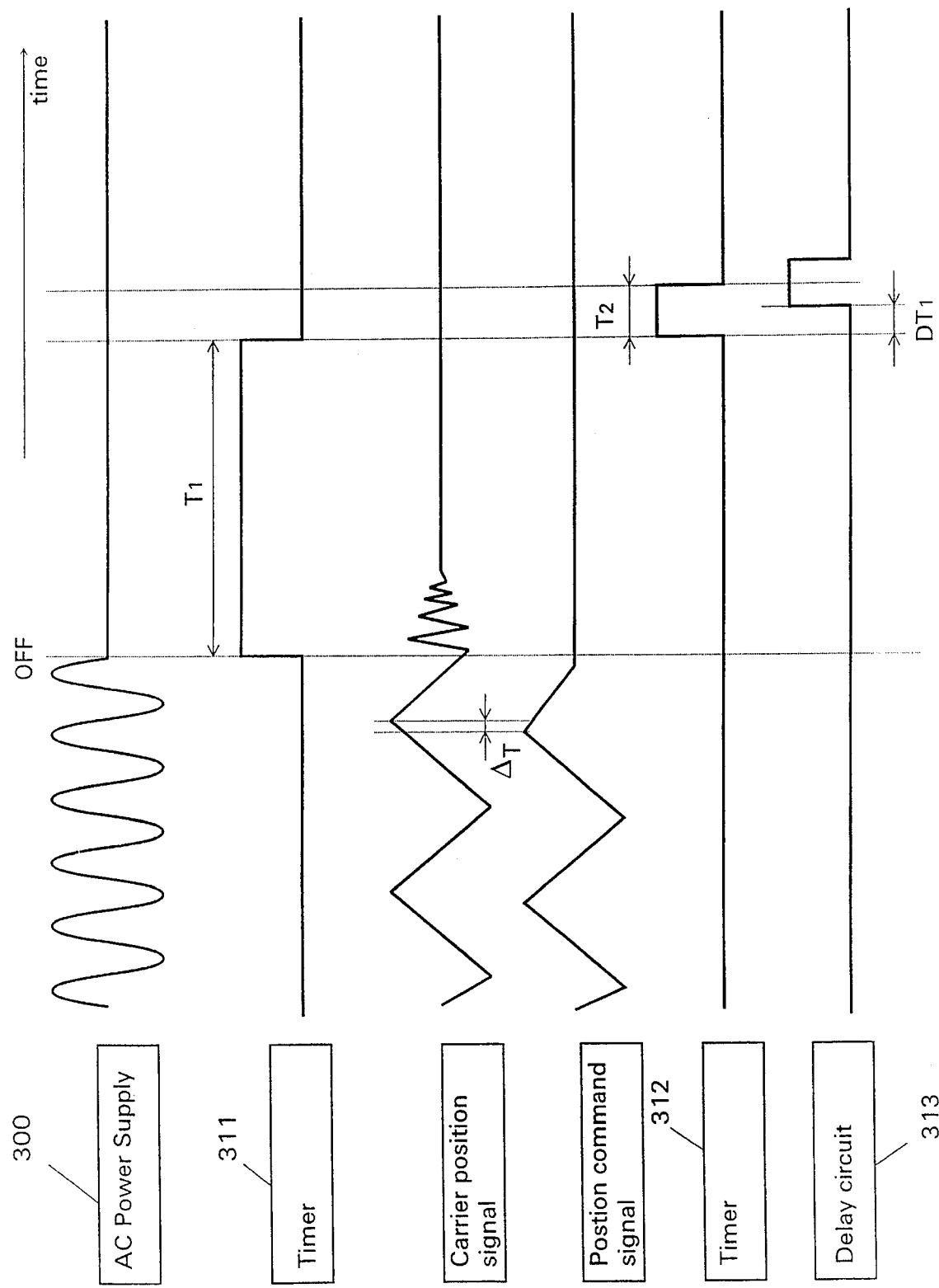
FIG. 17 illustrates time charts of the catching unit.

Since an uncontrollable motion of the carrier 50 is caused by an inertial force of the carrier 50 when the supply of electric current to the movable coil 60 is accidentally stopped during the scanning operation, the displacement detector 1 also comprises a carrier catching unit 302, as shown in FIG. 16. For example, when an AC power supply 300 for the displacement detector 1 is suddenly turned off, a power monitor 301 outputs a power-off detecting signal to a first timer 311. In response to the power-off detecting signal, the first timer 311 outputs to the carrier control unit 7 a carrier hold signal to electrically catch the carrier 50 at a carrier catching position with the use of a back-up power supply 303. The back-up power supply 303 is formed with a condenser which is capable of supplying electric current for about 200 milliseconds after the AC power supply 300 is turned off. The catching position is determined by a DC value provided from the input unit 8, Which designates the position command signal of the carrier 50 provided from the input unit 8 immediately before the AC power supply 300 is turned off. After a first time period T1, the carrier 50 is mechanically caught at the carrier catching position by the catching unit 302. The first time period is predetermined by the first timer 311. As shown in FIGS. 2 and 3, the catching unit 302 comprises a rugged member 320 having a plurality of triangular notches 322 arranged in the scanning direction, a triangular hook 51 provided on the carrier 50, and a solenoid 305 for moving the rugged member 320 toward the carrier 50 to engage the triangular hook 51 with the notches 322. The solenoid 305 is formed with a solenoid housing 351 fixed to the support structure (not shown) of the displacement detector 1, a movable iron core 352 projected from the housing 351, a spring 353 disposed around the movable iron core 352, a permanent magnet (not shown) incorporated in the housing 351. The rugged member 320 is formed with a catching rail 321 having the notches 322, a pair of arms (323 and 324) extending in a perpendicular direction from both ends of the catching rail 321, and pivot shafts 325 projected from central positions of the arms (323 and 324). A free end of the arm 323 is provided with a joint 326 to be connected to the iron core 352. The pivot shafts 325 are rotatably supported to the support structure of the displacement detector 1 such that the arms (323 and 324) can be moved about the pivot shafts 325 in a seesaw fashion. After the first time period T1, a second timer 312 outputs a solenoid set signal to the solenoid 305 for a second time period T2 to perform the mechanical catching of the carrier 50 with the catching unit 302. The second time period T2 corresponds to a width of solenoid set pulse. When the solenoid set signal is not supplied to the solenoid 305, the movable iron core 352 is supported by the permanent magnet. The solenoid set signal designates solenoid current supplied to the solenoid 305 to leave the movable iron core 352 from the permanent magnet. When the solenoid 305 is energized by the solenoid set signal to move the movable iron core 352 downwardly from the solenoid housing 351 together with the joint 326 of the rugged member 320, the arms (323 and 324) are rotated about the pivot shaft 325 in a clockwise direction, as indicated by the arrow L of FIG. 2, so that the catching rail 321 is moved upwardly to engage the notches 322 thereof to the triangular hook 51 of the carrier 50. The solenoid set signal is also supplied to a delay circuit 313. As shown in FIG. 17, after the delay circuit 313 receives the solenoid set signal, and a delay time DT1 passes, it outputs a coil-off signal for turning off the motor switch 18 to the switch circuit 200. When the AC power supply 300 is turned off, the above explained catching operation can be performed by the use of the back-up power supply 303. Thus, since the carrier 50 is electrically and mechanically caught when the AC power supply 300 is turned off, it is possible to prevent an accidental collision of the carrier 50 with the stationary frame 11 of the linear motor 10.

In the first safeguard unit 201, when the value of electric current monitored by the current monitor 211 exceeds the first threshold value, the first stop signal is also sent from the first comparator 212 to the carrier control unit 7. In response to the first stop signal, the carrier control unit 7 supplies a solenoid current to the solenoid 305 to perform the mechanical catching of the carrier 50, as shown in FIG. 10. As a result, when the first safeguard unit 201 detects the unusual operation of the linear motor 10, it is possible to protect the carrier 50 by the catching unit 302. Similarly the catching operation of the carrier 50 can be performed in response to any one of the stop signals provided from the second to seventh safeguard units, as shown in FIGS. 11 to 15.

Figure 18:
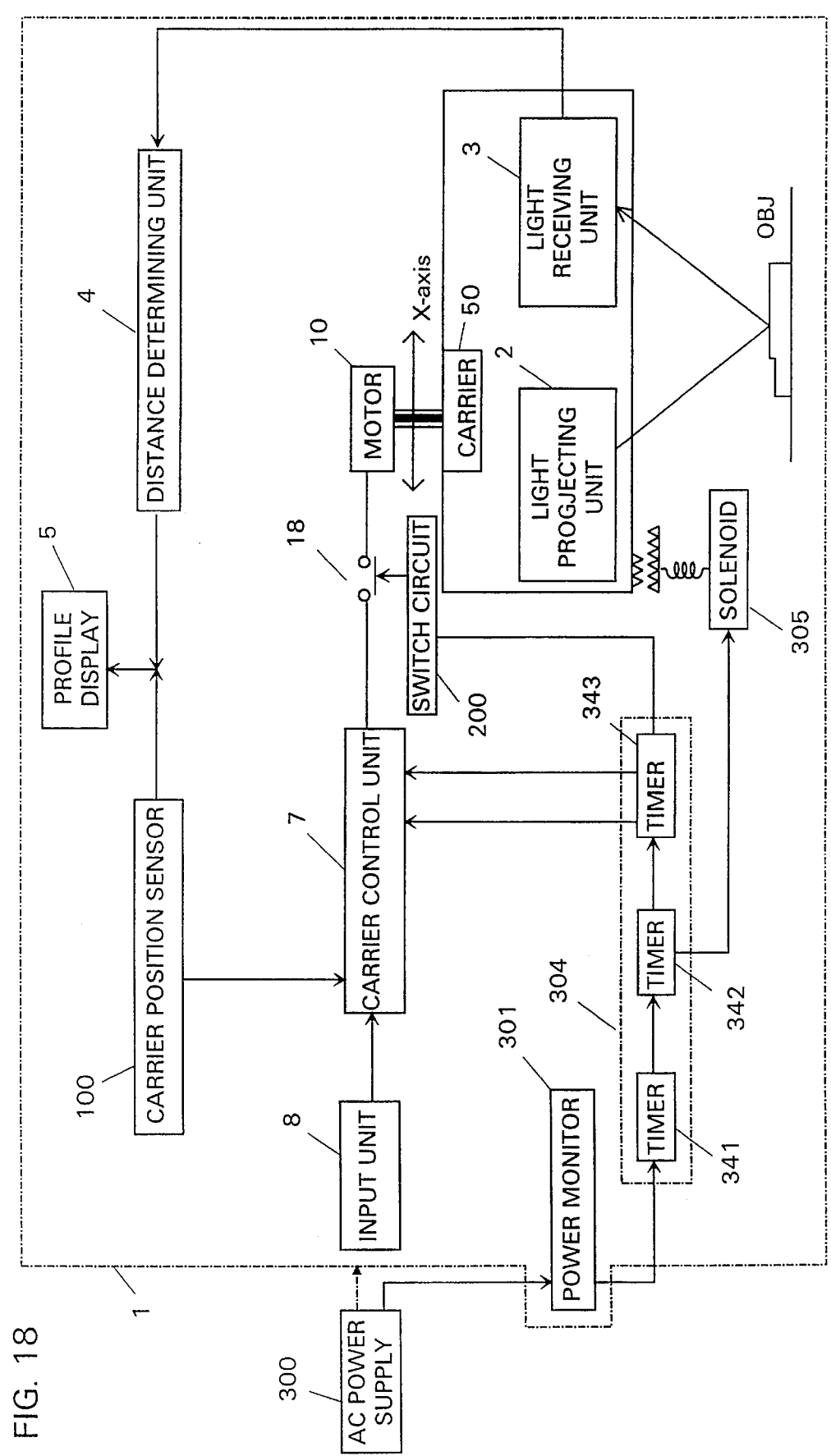
FIG. 18 is a block diagram of a carrier position reset unit of the present invention.
Figure 19:
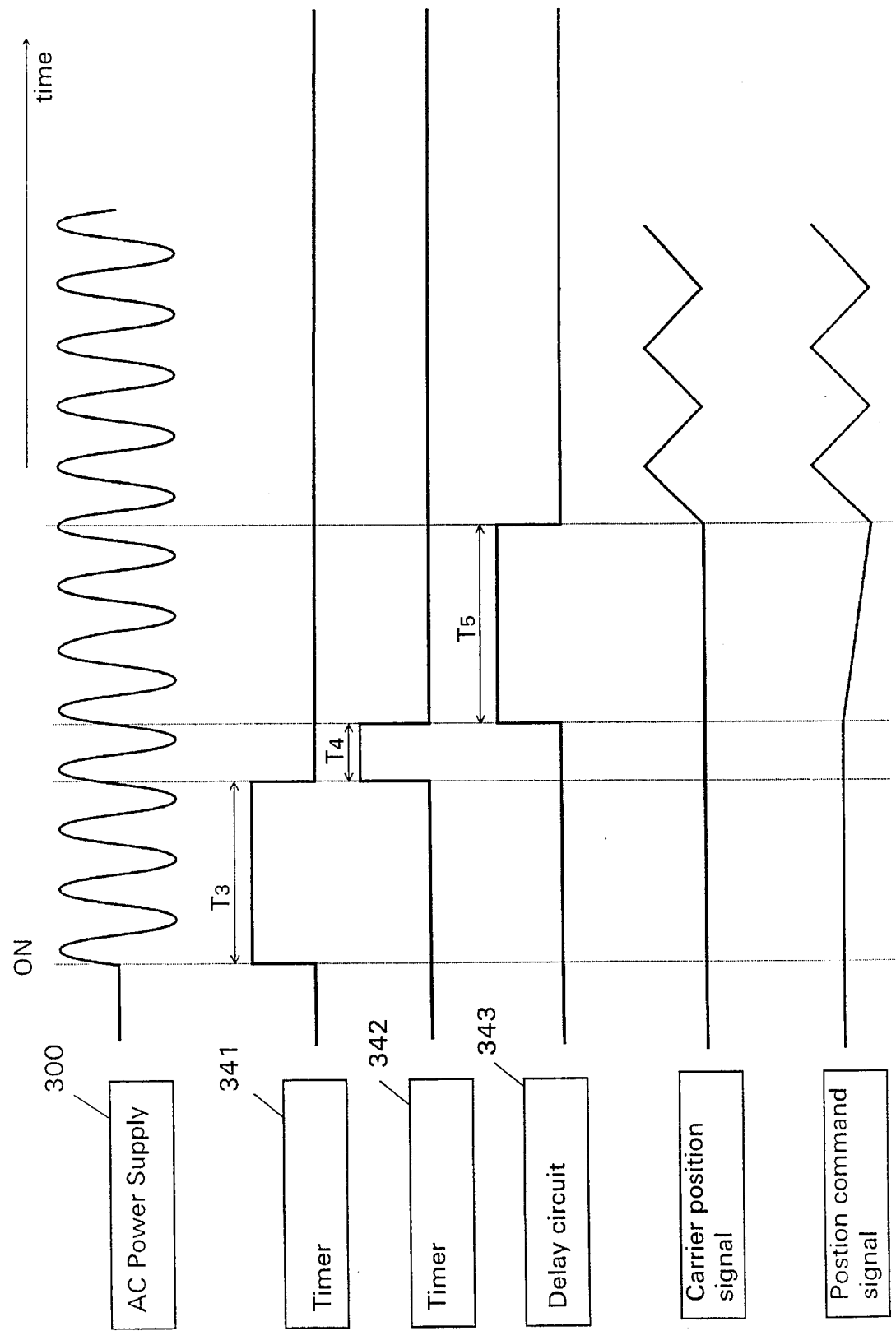
FIG. 19 illustrates time charts of the reset unit.

The displacement detector 1 also comprises a carrier position reset unit 304 for moving the carrier 50 from the catching position to a scanning start position at a relatively low speed, as shown in FIG. 18. For example, when the AC power supply 300 is turned on, the power monitor 301 outputs a power-on detecting signal to a third timer 341. The displacement detector 1 is left for a third time period T3 provided from the third timer 341 until the carrier control unit 7 and the carrier position sensor 100 are active. After the third time period T3, a fourth timer 342 outputs a solenoid reset signal to the solenoid 305 for a fourth time period T4 to release the mechanical catching of the carrier 50 with the catching unit 302. The fourth time period T4 corresponds to a width of the solenoid reset pulse. The solenoid reset signal designates a solenoid current supplied to the solenoid 305 to support the movable iron core 352 with the permanent magnet. That is, when the solenoid 305 is energized by the solenoid reset signal to move the movable iron core 352 upwardly against spring bias of the spring 353, the arms (323 and 324) are rotated about the pivot shaft 325 in a counterclockwise direction, as indicated by the arrow R of FIG. 2, so that the catching rail 321 is moved downwardly to disengage the notches 322 thereof from the triangular hook 51 of the carrier 50. Subsequently, a fifth timer 343 outputs to the switch circuit 200 a coil-on signal for turning on the motor switch 18 to start the supply of electric current to the movable coil 60. At the same time, the fifth timer 343 also outputs a pulse signal having the pulse width of a fifth time period T5 to a position gain unit (not shown) which is included in the carrier control unit 7. As shown in FIGS. 17 and 19, a phase difference $\Delta T$ occurs between a triangular wave indicative of the position command signal and the triangular wave indicative of the carrier position signal. The phase difference $\Delta T$ can be increased or decreased by varying a position gain at the position gain unit in response to the pulse signal provided from the fifth timer 343. That is, as a higher position gain is set, the phase difference $\Delta T$ is decreased, so that the carrier 50 may be moved quickly in response to the position command signal. For example, the carrier 50 is moved under the condition of a relatively high position gain to perform a scanning operation. When the AC power supply 300 is suddenly turned off, the carrier 50 is electrically and mechanically caught by the catching unit 302 at the catching position, as explained above. Subsequently, when electric power is supplied again to the displacement detector 1 from the AC power supply 300, the carrier control unit 7 outputs to the linear motor 10 an initial signal for moving the carrier 50 form the catching position to the scanning start position. As a distance between the catching position and the scanning start position is longer, the carrier 50 is moved at a higher speed to the scanning start position due to the high position gain, so that the provability of collision of the carrier 50 with the stationary frame 11 of the linear motor 10 would be increased. In the present invention, since the high position gain is decreased to a relatively low position gain in response to the pulse signal provided from the fifth timer 343, it is possible to move the carrier 50 from the catching position to the scanning start position at the relatively low speed to prevent such an accidental collision. The fifth timer 343 also outputs to the control unit 7 a scanning start signal for resuming the scanning operation.

Figure 20:
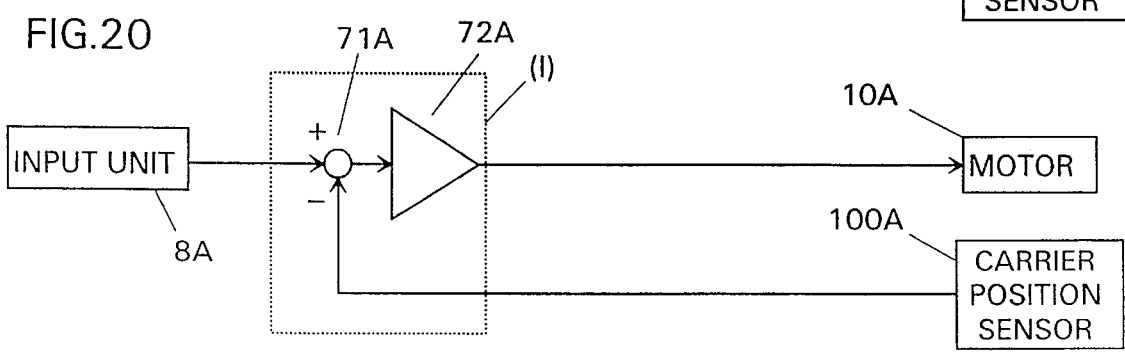
FIG. 20 is a block diagram illustrating of a first modification of the carrier control unit of the first embodiment.

As a first modification of the control unit 7 of the first embodiment, a carrier control unit applying only sub-control section (I) may be used in place of the control unit 7, as shown in FIG. 20. In this case, electric current corresponding to a first error signal provided from the sub-control section (I) is supplied to a voice-coil linear motor 10A.

Figure 21:
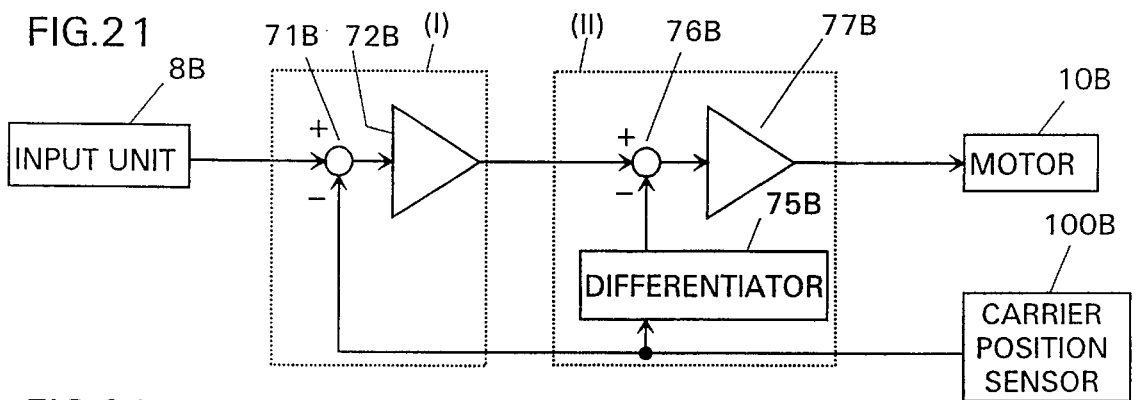
FIG. 21 is a block diagram illustrating a second modification of the carrier control unit of the first embodiment.

As a second modification of the control unit 7 of the first embodiment, a carrier control unit applying only sub-control sections (I) and (III) may be used in place of the control unit 7, as shown in FIG. 21. A second subtracter 76B of the sub-control unit (III) provides a third error signal indicative of a difference between the first error signal provided from the sub-control unit (I) and the first differential value of the carrier position signal provided from the second differentiator 75B. Therefore, in this case, electric current corresponding to the third error signal is supplied to a voice-coil linear motor 10B.

Figure 22:
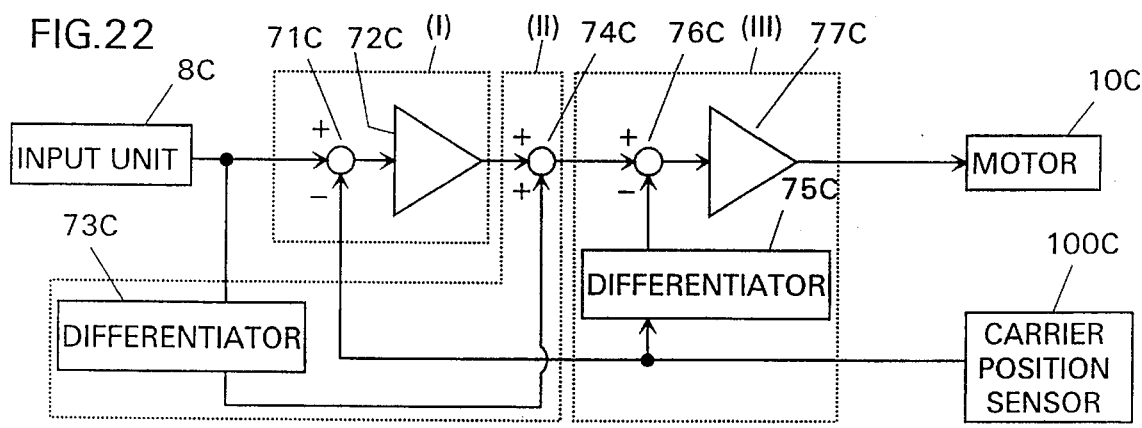
FIG. 22 is a block diagram illustrating a third modification of the carrier control unit of the first embodiment.

As a third modification of the control unit 7 of the first embodiment, a carrier control unit applying the only sub-control sections (I) to (III) may be used in place of the control unit 7, as shown in FIG. 22. Therefore, in this case, electric current corresponding to a third error signal provided from the sub-control unit (III) is supplied to a voice-coil linear motor 10C.

Figure 23A:
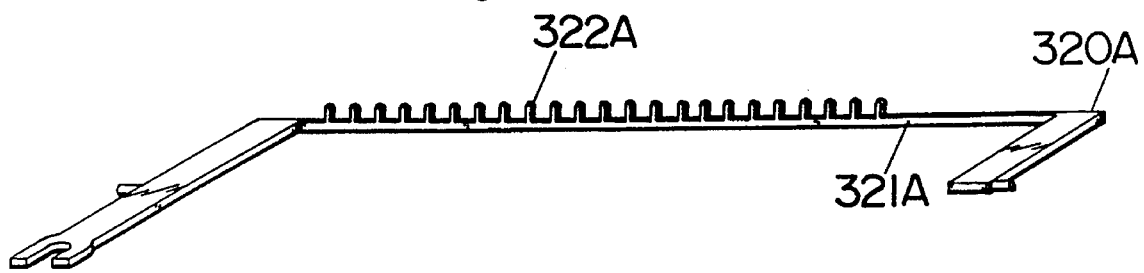
FIGS. 23A and 23B show modifications of the carrier catching unit of the first embodiment.
Figure 23B:
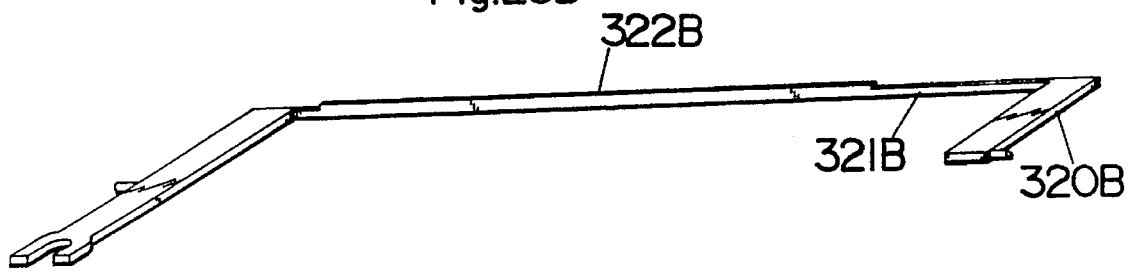

As a modification of the carrier catching unit 302 of the first embodiment, a plurality of rectangular notches 322A may be formed on a catching rail 321A in place of the triangular notches 322, as shown in FIG. 23A. In this case, a carrier (not shown) has a rectangular hook to be engaged with the rectangular notches 322A. As a further modification of the carrier catching unit 302 of the first embodiment, a rubber pad 322B may be provided on a catching rail 321B in place of the notches 322, as shown in FIG. 23B. In this case, the rubber pad 322B may effect as a friction brake for stopping the traveling of a carrier.

<Second Embodiment>

Figure 24:
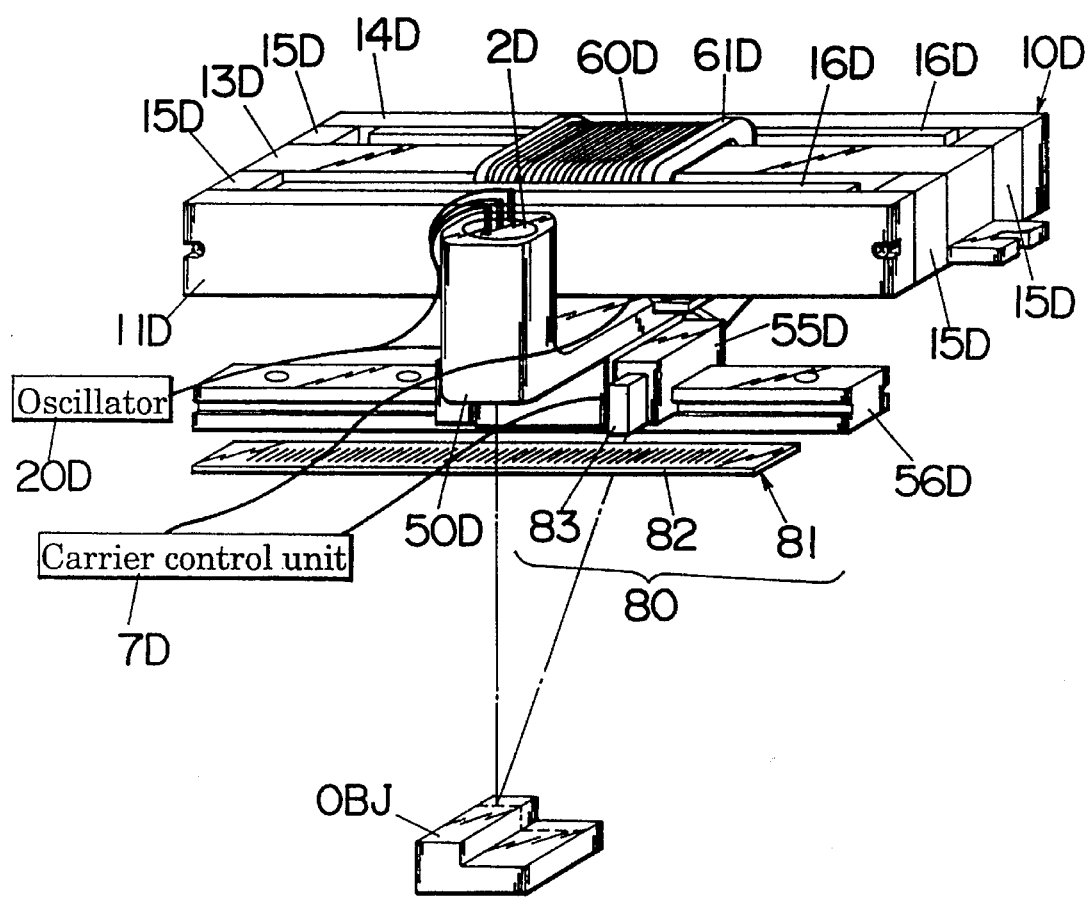
FIG. 24 is a perspective view of an optically scanning displacement detector using an encoder of a second embodiment of the present invention.

An optically scanning displacement detector 1D) of the second embodiment of the present invention is the substantially same as that of the first embodiment except that a linear encoder 80 is utilized in place of the carrier position sensor 100. Therefore, no duplicate explanation to common parts is deemed necessary. Like parts are designated by numerals with a suffixed letter of "D". The linear encoder 80 is used for measuring a position of a carrier 50D when a movable coil 60D of a voice-coil linear motor 10D is moved in a scanning direction. That is, as shown in FIG. 24, the encoder 80 is formed with a linear scale 81 having a code pattern 82 arranged in the scanning direction, and a code sensor 83 fixed to a slider 55D. The code sensor 83 is capable of optically or magnetically detecting the code pattern 82 to provide a carrier position signal indicative of the position of the carrier 50D in the scanning direction.

<Third Embodiment>

An optically scanning displacement detector of the third embodiment of the present invention is the substantially same as that of the first embodiment except that a linear step motor 9 is utilized in place of the voice-coil linear motor 10, and a position of a carrier in a scanning direction is measured by the use of a pulse counter (not shown).

Figure 25:
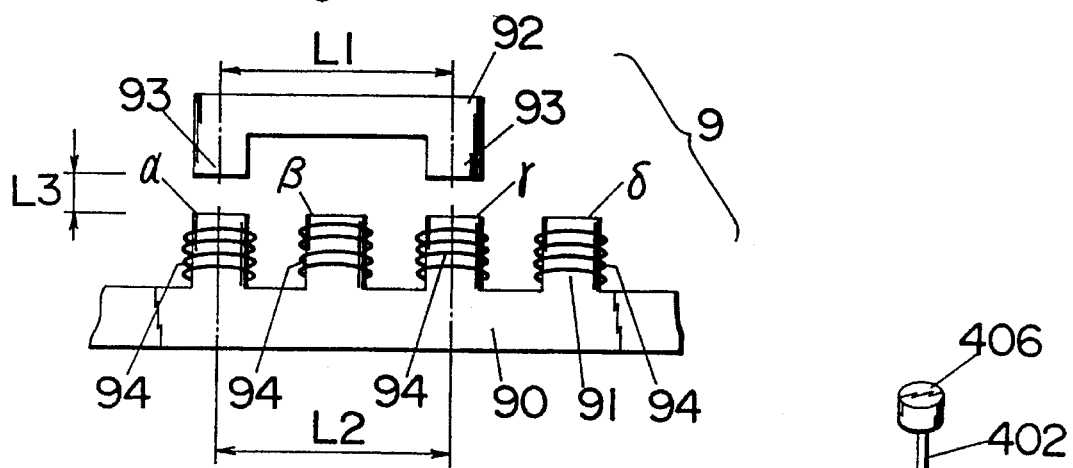
FIG. 25 shows a mechanism of a linear step motor used in an optically scanning displacement detector of a third embodiment of the present invention.

As shown in FIG. 25, the step motor 9 comprises a stator 90 having a plurality of magnetic teeth 91 arranged in the scanning direction, a magnetic body 92 having a pair of magnetic arms 93, and a rail (not shown) for slidably supporting the magnetic body 92 in the scanning direction. A field coil 94 is wound on each of the magnetic teeth 91. A distance L1 between the magnetic arms 93 is slightly different from a distance L2 indicative of two times pitches between adjacent magnetic teeth 91. The magnetic body 92 is spaced away from the stator 90 by a distance L3 such that the magnetic arms 93 are arranged in a face-to-face relation with the magnetic teeth 91. A carrier mounting light projecting and receiving units is fixed to the magnetic body 92. For explaining a method of moving the magnetic body 92 in the scanning direction, the magnetic teeth 91 are respectively defined as $\alpha$-magnetic tooth, $\beta$-magnetic tooth, $\gamma$-magnetic tooth, and $\delta$-magnetic tooth . . . , in order from the magnetic tooth 91 located at the left end of FIG. 25. For example, a first excitation of the $\alpha$- and $\gamma$-magnetic teeth 91 is performed, and the next moment the first excitation is switched to a second excitation of the $\beta$- and $\delta$-magnetic teeth 91. The first excitation is performed by supplying electric current to each of the field coils 94 of the $\alpha$- and $\gamma$-magnetic teeth 91 for a short time period. Similarly the second excitation is performed by supplying electric current to each of the field coils 94 of the β- and δ-magnetic teeth 91 for the short time period. Thus, by repeating the excitation of the magnetic teeth 91, an electromagnetic force is generated to move the magnetic body 92 in the scanning direction. Since the repeat number of the excitation is determined by a pulse number inputted to the step motor 9, there is a one-to-one correspondence between the pulse number and a traveling distance of the magnetic body 92. Therefore, it is possible to detect the position of the carrier in accordance with the pulse number counted by the pulse counter without using the carrier position sensor 100 of the first embodiment. For improving a response property of the step motor 9, it is preferred to apply the pulse number in a unit time, that is, a pulse repetition frequency, to determine the position of the carrier in the scanning direction. As a modification of the magnetic body 92 of the third embodiment, magnetic arms may be made of permanent magnet.

<Fourth Embodiment>

An optically scanning displacement detector of the fourth embodiment of the present invention is the substantially same as that of the first embodiment except that a belt-type carrier traveling device 400 is utilized in place of the voice-coil linear motor 10. Therefore, no duplicate explanation to common parts is deemed necessary. Like parts are designated by numerals with a suffixed letter of "E".

Figure 26:
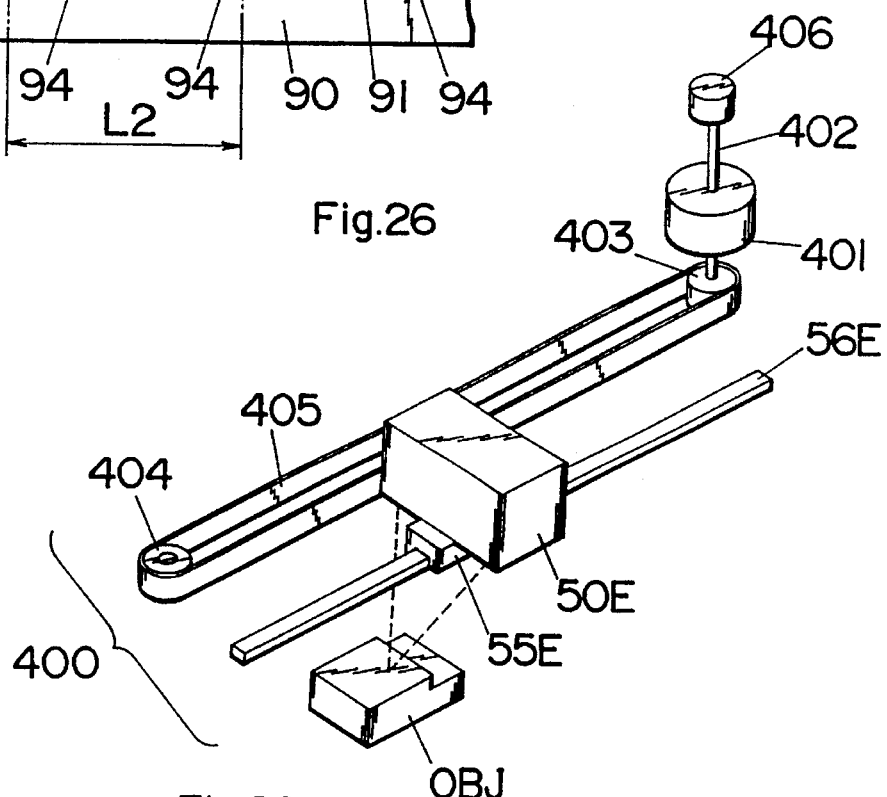
FIG. 26 is a perspective view of a carrier traveling device used in an optically scanning displacement detector of a fourth embodiment of the present invention.

As shown in FIG. 26, the carrier traveling device 400 is formed with a reversible motor 401 having a drive shaft 402, a pair of head and take-up pulleys (403 and 404) arranged in a scanning direction, and an endless belt 405 stretched between the pulleys (403 and 404). The drive shaft 402 is connected to the head pulley 403. A carrier 50E mounting light projecting and receiving units is fixed to the endless belt 405. When the head pulley 403 is rotated by the reversible motor 401, the carrier 50E can be moved in the scanning direction. A slider 55E fixed to the carrier 50E is also slidably supported to a guide rail 56E extending in the scanning direction. A rotary encoder 406 is connected to the drive shaft 402 to detect a rotation angle of the drive shaft. A position of the carrier 50E in the scanning direction can be determined in accordance with the rotation angle.

Figure 27:
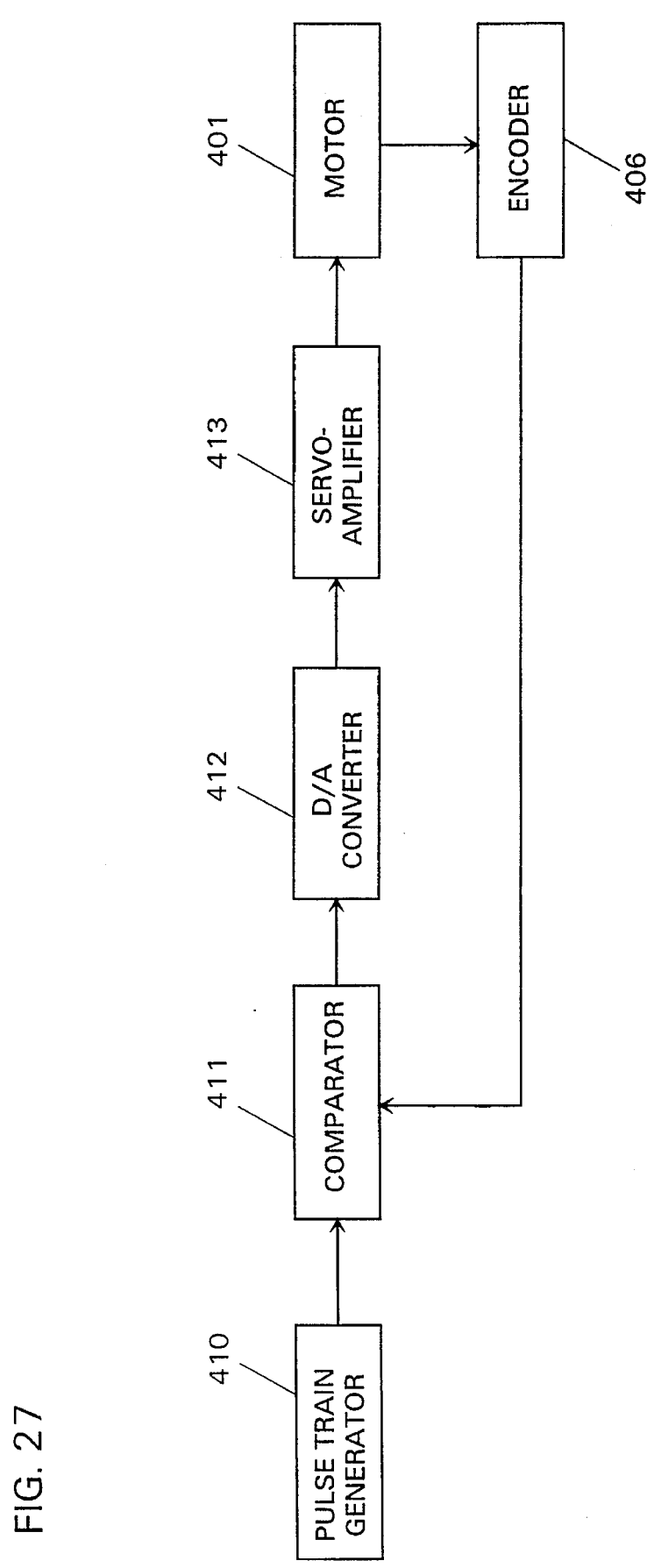
FIG. 27 is a signal processing unit employed in the displacement detector of the fourth embodiment.

For performing a precise scanning operation along scanning parameters, the traveling device 400 can be controlled in a feed-back manner, as shown in FIG. 27. That is, a pulse train generator 410 outputs a pulse number in accordance with the scanning parameters. The pulse number is compared with a measured pulse number provided from the rotary encoder 406 at a comparator 411 to obtain an error signal therebetween. The comparator 411 outputs a control signal for reducing the error signal. The control signal is converted to an analog control signal at a D/A converter 412, and then amplified at a servo amplifier 413 to supply electric current corresponding to the control signal to the reversible motor 401. As a modification of the fourth embodiment, a pulse motor may be used in place of the reversible motor 401. In such a case, it is possible to determine the position of the carrier in the scanning direction without using the rotary encoder 406.

<Fifth Embodiment>

An optically scanning displacement detector of the fifth embodiment of the present invention is the substantially same as that of the first embodiment except that a carrier traveling device 500 is utilized in place of the voice-coil linear motor 10. Therefore, no duplicate explanation to common parts is deemed necessary. Like parts are designated by numerals with a suffixed letter of "F".

Figure 28:
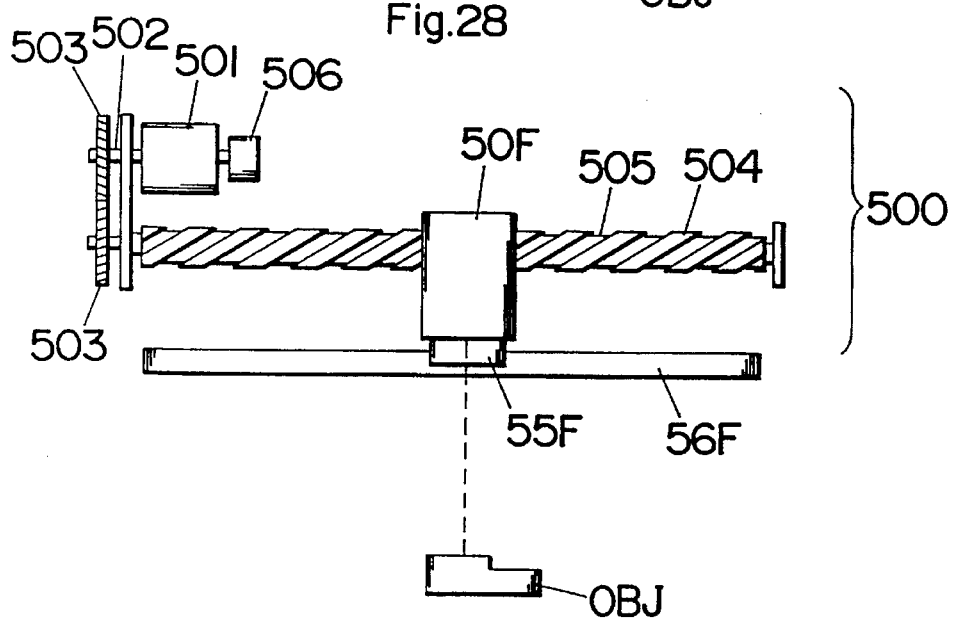
FIG. 28 show a mechanism of a carrier traveling device used in an optically scanning displacement detector of a fifth embodiment of the present invention.

As shown in FIG. 28, the carrier traveling device 500 is formed with a reversible motor 501 having a drive shaft 502, a rotatable shaft 504 having a spiral groove 505, and a gear system 503 for transmitting a rotation of the drive shaft 502 to the rotatable shaft 504. The rotatable shaft 504 is disposed to have its axis extending in a scanning direction. A carrier 50F mounting light projecting and receiving units is slidably engaged with the spiral groove 505 to move in the scanning direction in response to the rotation of the rotatable shaft 504. A position of the carrier 50F in the scanning direction is determined by the use of a rotary encoder 506 connected to the drive shaft 502. In this embodiment, it is possible to adopt the feed-back manner utilized in the traveling device 400 of the fourth embodiment.

<Sixth Embodiment>

An optically scanning displacement detector of the sixth embodiment of the present invention is the substantially same as that of the first embodiment except that a carrier position sensor 100G is utilized in place of the position sensor 100. Therefore, no duplicate explanation to common parts is deemed necessary. Like parts are designated by numerals with a suffixed letter of "G".

Figure 29:
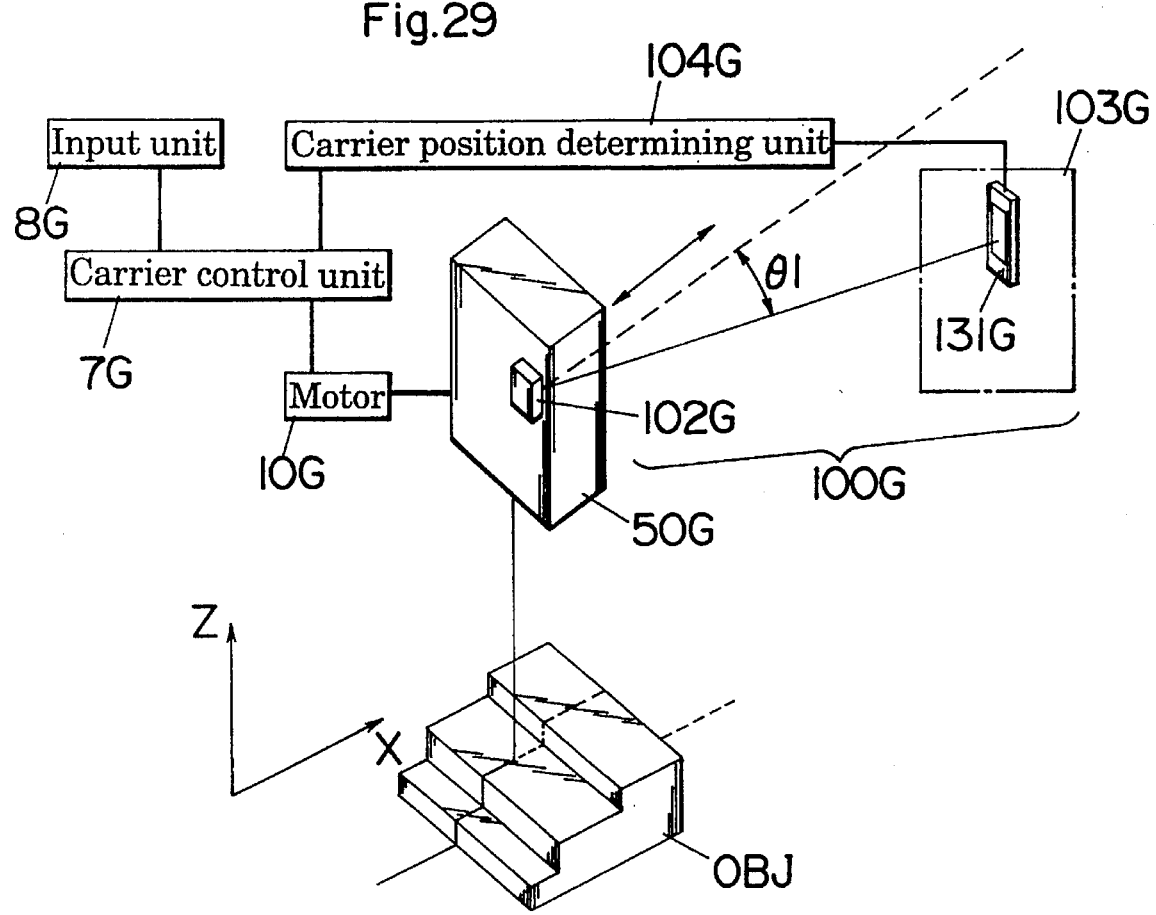
FIG. 29 is a perspective view illustrating a mechanism of carrier position sensor used in an optically scanning displacement detector of a sixth embodiment of the present invention.

As shown in FIG. 29, the position sensor 100G comprises an additional light projecting unit 102G for radiating a sensor light beam, an additional light receiving unit 103G for receiving the sensor light beam to generate a carrier position signal, a carrier position determining unit 104G for determining a position of the carrier 50G in a scanning direction in accordance with the carrier position signal. The additional light projecting unit 102G is mounted on the carrier 50G. The additional light receiving unit 103G is fixed to a support structure (not shown) of the displacement detector so as to receive the sensor light beam radiated in a direction θ1 inclined with respect to the scanning direction from the additional light projecting unit 102G.

Figure 30:
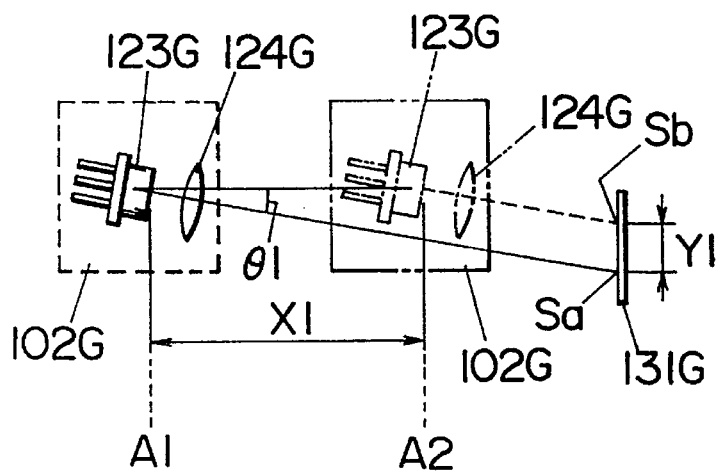
FIG. 30 shows a method of determining a position of the carrier in a scanning direction in the sixth embodiment.

For example, as shown in FIG. 30, when the sensor light beam is radiated from a light emitting element 123G of the projecting unit 102G which is located at a position A1, a first condensed light spot Sa is provided on a light receiving element 131G of the receiving unit 103G. Then, the carrier 50G is moved from the position A1 to a position A2 in the scanning direction. When the sensor light beam is radiated from the projecting unit 102G at the position A2, a second condensed light spot Sb is formed on the receiving element 131G. When a travel distance between the positions A1 and A2 is designated as X1, a distance Y1 between the first and second light spots (Sa and Sb) is expressed by the following equation:

$$Y1 = X1 \times (\tan\theta 1).$$

Therefore, the position of the carrier 50G in the scanning direction is obtained by determining the distance Y1 in accordance with the carrier position signals provided from the receiving unit 103G. The signal processing circuit of the position sensor 100 of the first embodiment may be utilized in the sixth embodiment.

As a modification of the sixth embodiment, it is possible to fix the additional light projecting unit 102G to the support structure of the displacement detector, and mount the additional light receiving unit 103G on the carrier 50G.

<Seventh Embodiment>

An optically scanning displacement detector of the seventh embodiment of the present invention is the substantially same as that of the first embodiment except that a carrier position sensor 100' is utilized in place of the position sensor 100. Therefore, no duplicate explanation to common parts is deemed necessary. Like parts are designated by numerals with a symbol of dash.

Figure 31:
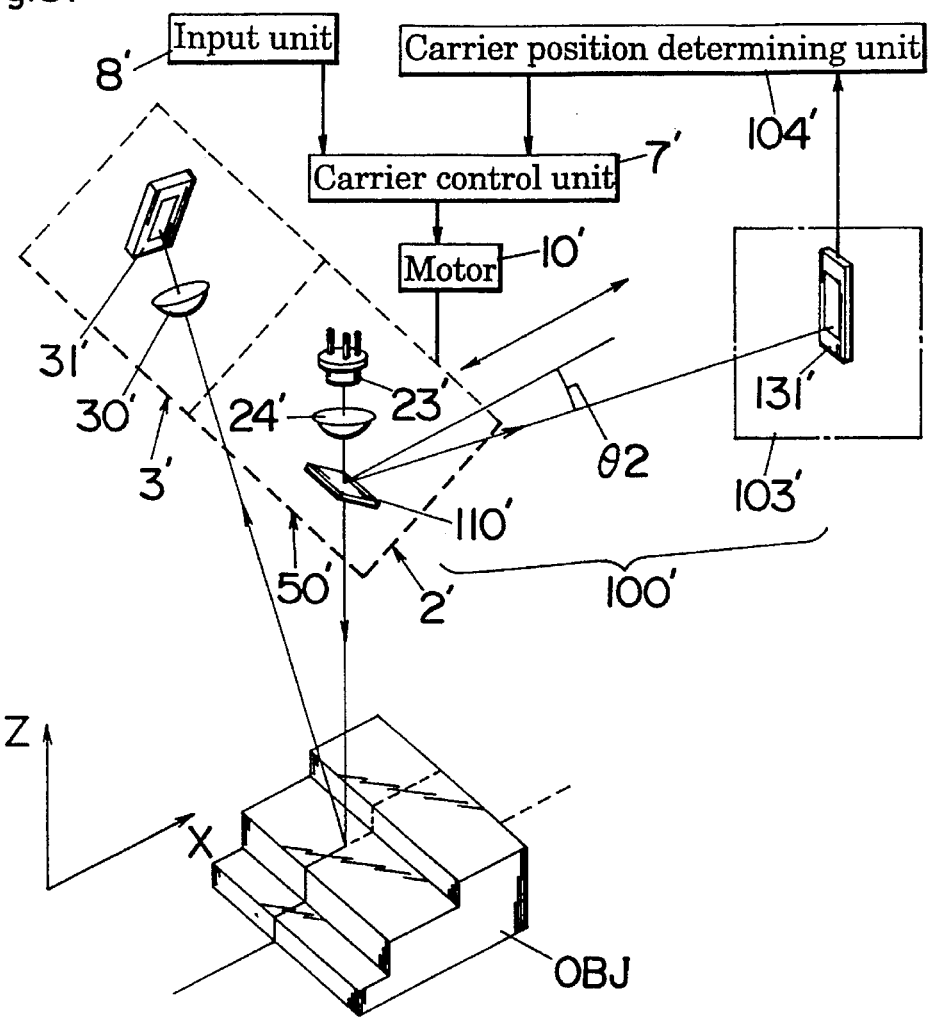
FIG. 31 is a perspective view illustrating a mechanism of carrier position sensor used in an optically scanning displacement detector of a seventh embodiment of the present invention.
Figure 34:
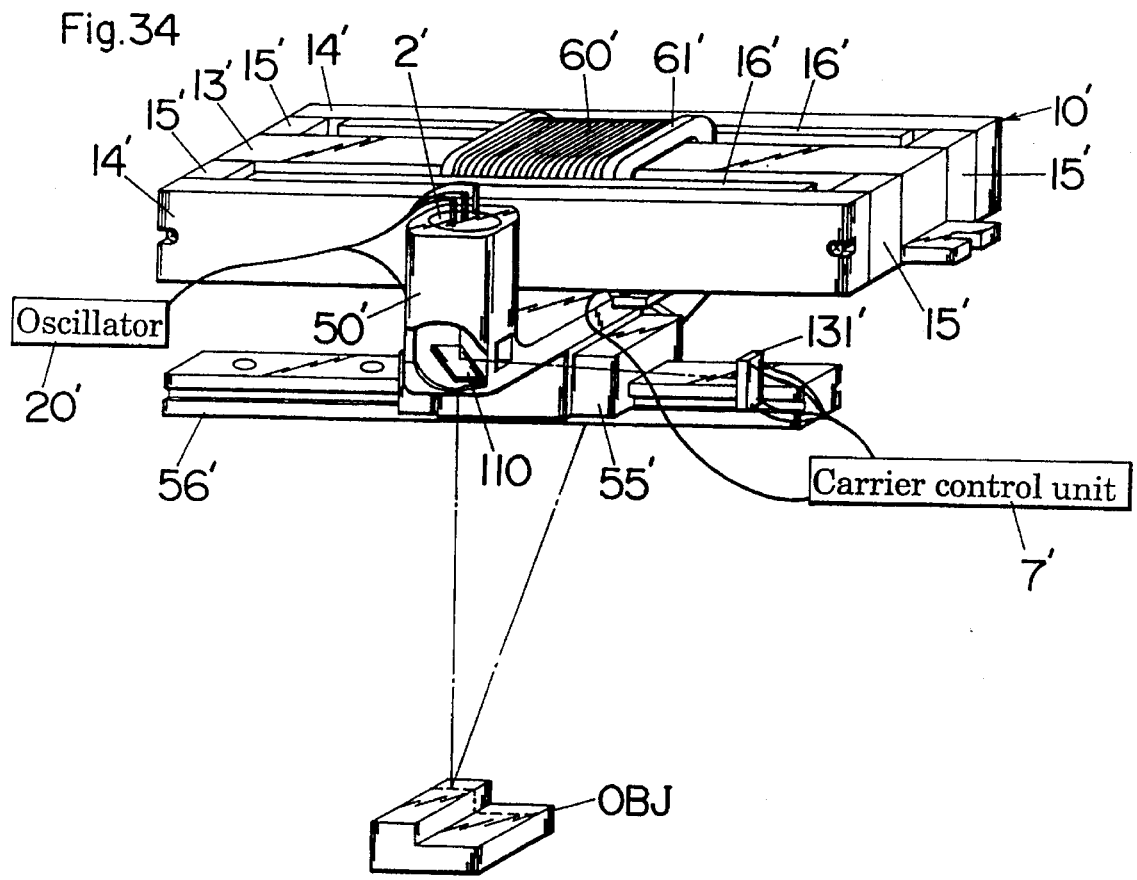
FIG. 34 is a perspective view of the displacement detector of the seventh embodiment.
Figure 35:
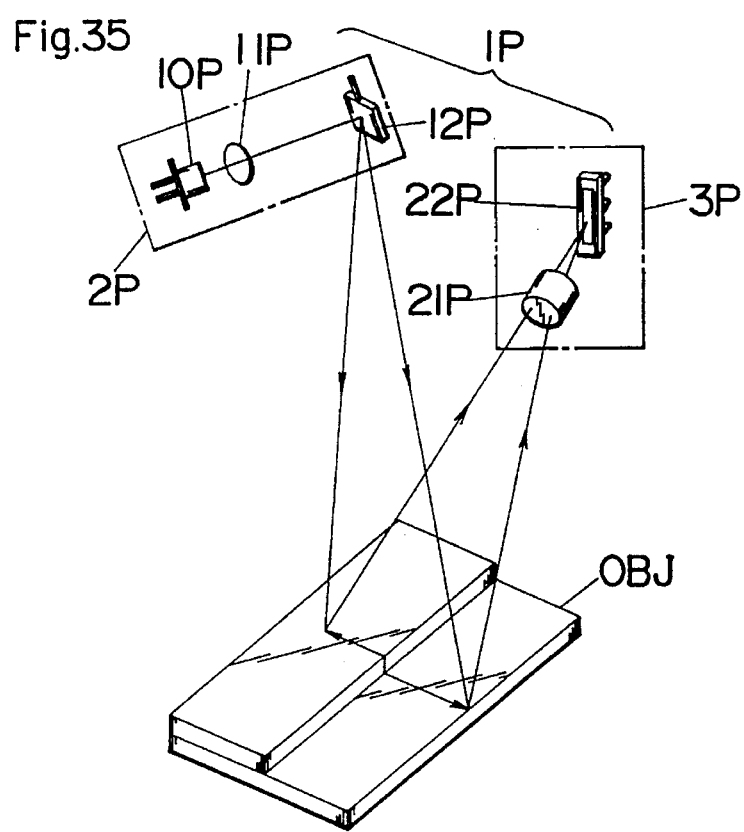
FIG. 35 is a perspective view illustrating a mechanism of an optically scanning displacement sensor of the prior art.
Figure 36:
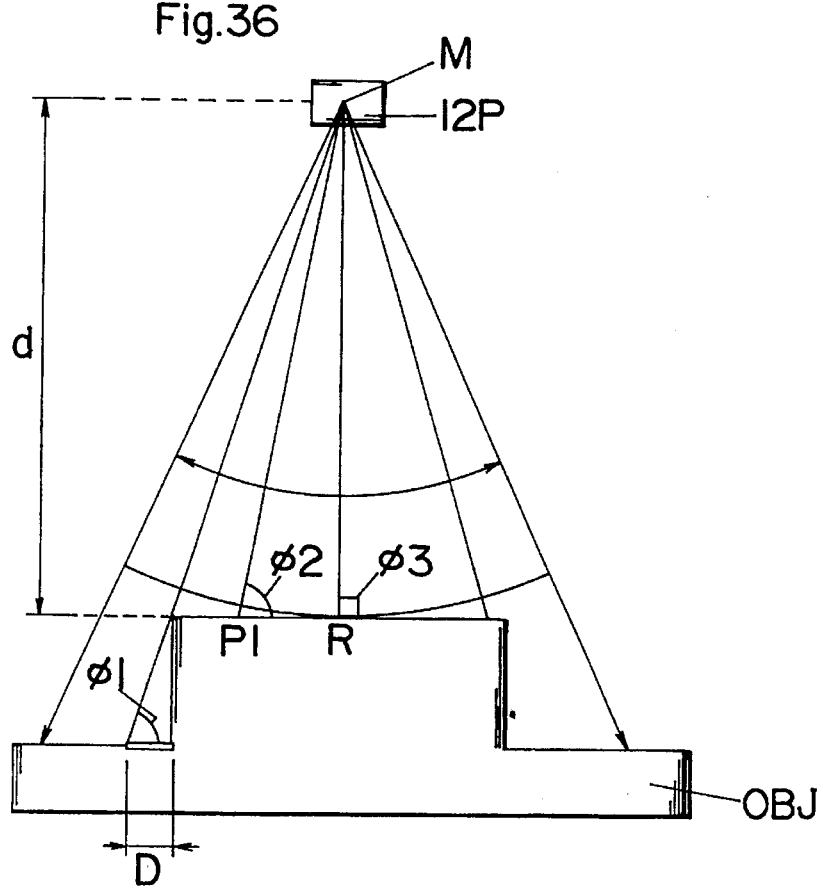
FIG. 36 is a schematic diagram used for explaining first and second problems of the displacement sensor of the prior art.
Figure 37:
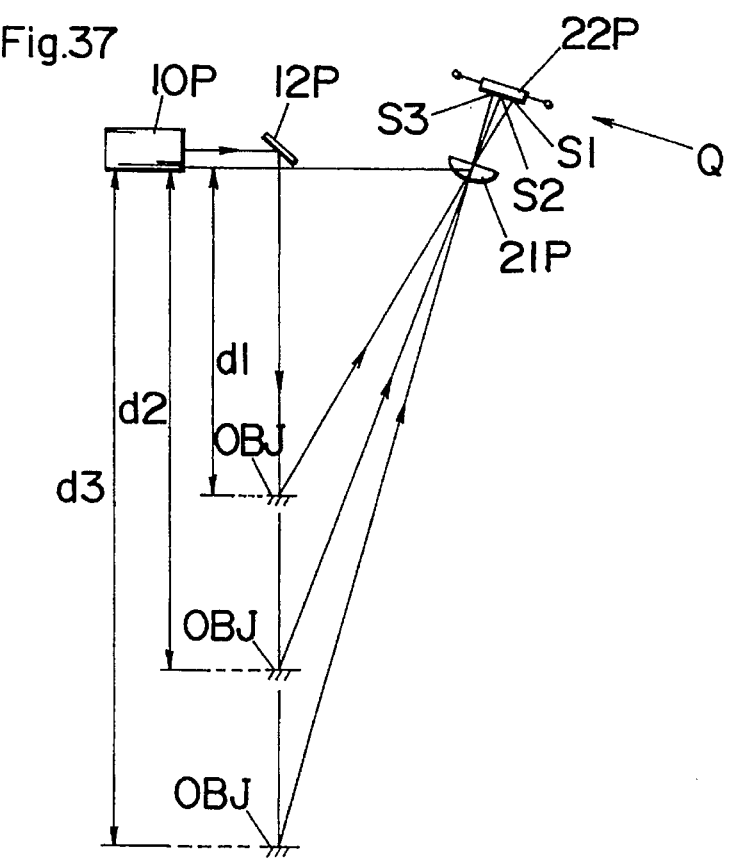
FIG. 37 is a schematic diagram used for explaining a third problem of the displacement sensor of the prior art.

As shown in FIG. 31, the position sensor 100' comprises a beam splitter 110 such as a half mirror for dividing a light beam radiated from a light projecting unit 2' to a main light beam directed to an object OBJ and a sensor light beam, an additional light receiving unit 103' for receiving the sensor light beam to generate a carrier position signal, and a carrier position determining unit 104' for determining a position of the carrier 50' in a scanning direction in accordance with the carrier position signal. The additional light receiving unit 103' is fixed to a support structure (not shown) of the displacement detector. The beam splitter 110 is incorporated in the carrier 50', as shown in FIG. 34.

Figure 32:
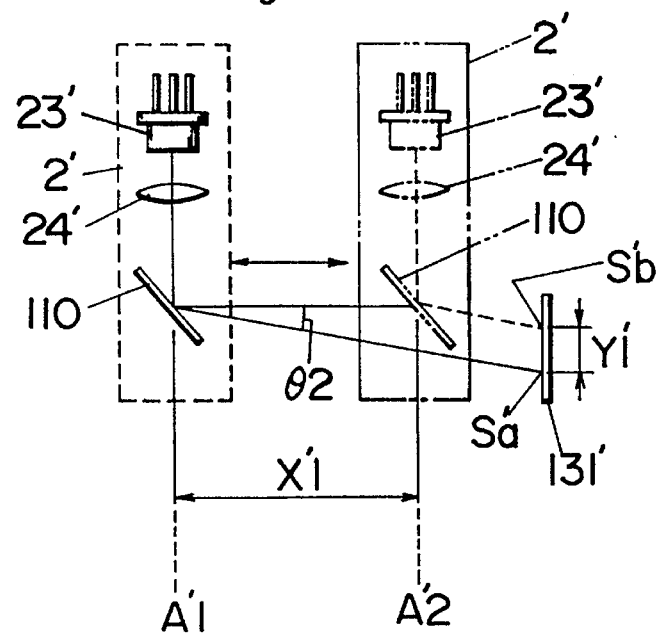
FIG. 32 shows a method of determining a position of the carrier in a scanning direction in the seventh embodiment.

As shown in FIG. 32, the light beam is radiated from a light emitting element 23' of the projecting unit 2' which is located at a position A'1 of the carrier 50'. The light beam is divided to the sensor light beam and the main light beam by the beam splitter 110. The main light beam is used to determine a distance between the object OBJ and the light projecting unit 2'. On the other hand, the sensor light beam proceeds in a direction θ2 inclined with respect to the scanning direction, and makes a first condensed light spot S'a on a light receiving element 131' of the receiving unit 103'. Then, the carrier 50' is moved from the position A'1 to a position A'2 in the scanning direction. When the sensor light beam is radiated from the beam splitter 110 at the position A'2, a second condensed light spot S'b is formed on the receiving element 131'. When a travel distance between the positions A'1 and A'2 is designated as X'1, a distance Y'1 between the first and second light spots (S'a and S'b) is expressed by the following equation:

$$Y'1 = X'1 \times (\tan\theta 2).$$

Therefore, the position of the carrier 50' in the scanning direction is obtained by determining the distance Y'1 in accordance with the carrier position signals provided from the receiving unit 103'. It is preferred that the receiving element 131' is disposed such that the sensor light beam is incident thereon at a right angle to improve accuracy of measurement.

Figure 33:
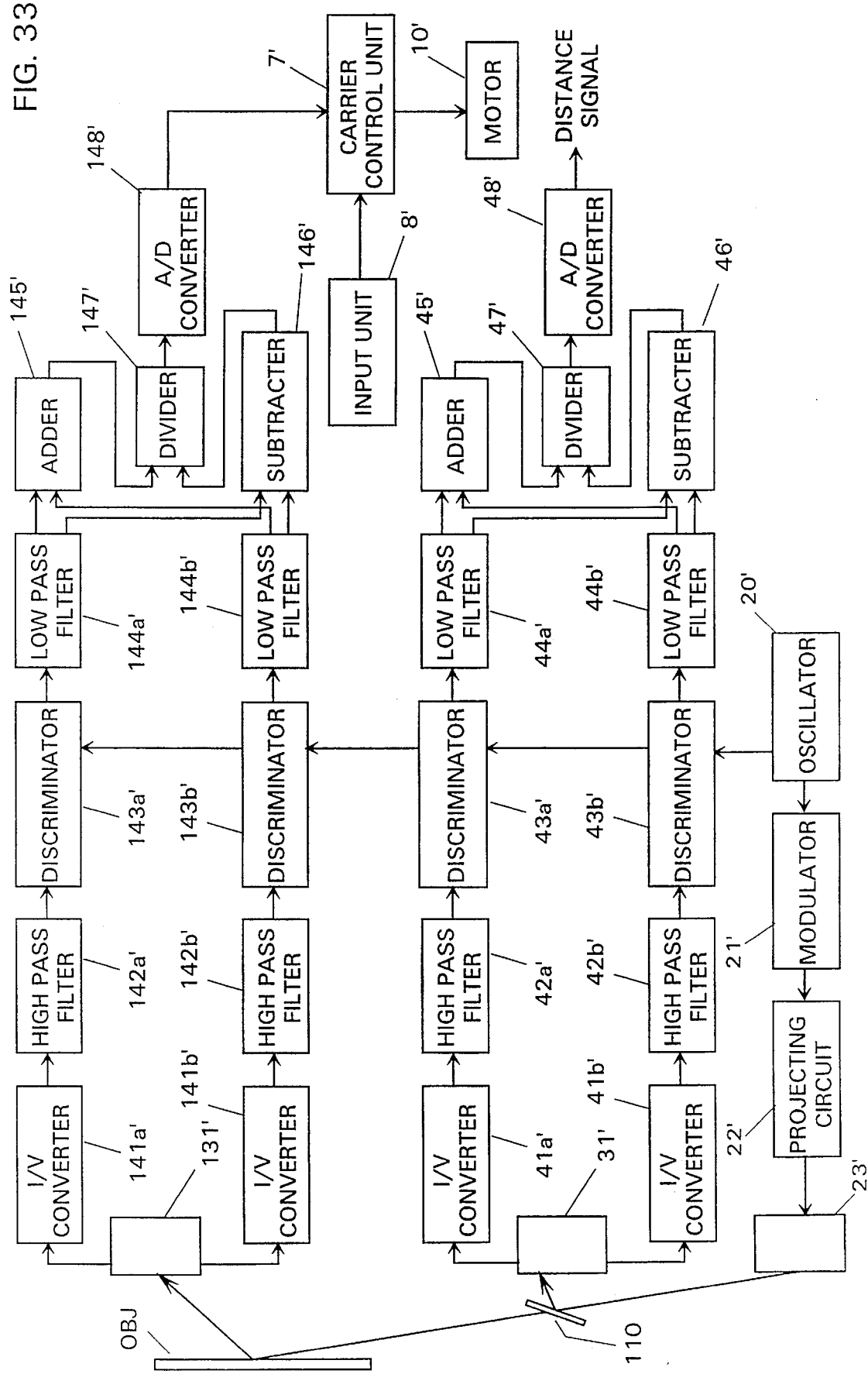
FIG. 33 is a block diagram of the carrier position sensor of the seventh embodiment.

Since a single light projecting unit 2' is used to obtain both of the distance between the object OBJ and the light projecting unit 2', and the position of the carrier 50', a processing circuit shown in FIG. 33 can be employed in the displacement detector of the seventh embodiment. That is, the processing unit is the substantially same as a combination of the processing unit of FIG. 6 with that of FIG. 8 except that all of discriminators 43a', 43b', 143a' and 143b' are synchronized with a clock pulse provided from a single oscillator 20' of the projecting unit 2'.

LIST OF REFERENCE NUMERALS

| | | | |
|---|---|---|---|
| 1 | optically scanning displacement detector | 42a | high pass filter |
| | | 42b | high pass filter |
| 2 | light projecting unit | 43a | discriminator |
| 3 | light receiving unit | 43b | discriminator |
| 4 | distance determining unit | 44a | low pass filter |
| 5 | profile display | 44b | low pass filter |
| 6 | stationary table | 45 | adder |
| 7 | carrier control unit | 46 | subtracter |
| 8 | input unit | 47 | divider |
| 9 | linear step motor | 48 | A/D converter |
| 10 | voice-coil linear motor | 50 | carrier |
| 11 | stationary frame | 51 | triangular hook |
| 13 | center yoke | 55 | slider |
| 14 | side yoke | 56 | guide rail |
| 15 | spacer | 57 | screw |
| 16 | permanent plate magnet | 60 | movable coil |
| 17 | traveling space | 61 | bobbin |
| 18 | motor switch | 62 | wire |
| 20 | oscillator | 63 | through-hole |

LIST OF REFERENCE NUMERALS -continued

| | | | |
|---|---|---|---|
| 21 | modulator | 64 | screw |
| 22 | projecting circuit | 71 | first subtracter |
| 23 | light emitting element | 72 | first amplifier |
| 24 | first focusing lens | 73 | first differentiator |
| 30 | second focusing lens | 74 | first adder |
| 31 | light receiving element | 75 | second differentiator |
| 41a | I/V converter | 76 | second subtracter |
| 41b | I/V converter | 77 | second amplifier |
| 78 | third differentiator | 131 | light receiving element |
| 79 | second adder | 141a | I/V converter |
| 80 | linear encoder | 141b | I/V converter |
| 81 | linear scale | 142a | high pass filter |
| 82 | code pattern | 142b | high pass filter |
| 83 | code sensor | 143a | discriminator |
| 90 | stator | 143b | discriminator |
| 91 | magnetic tooth | 144a | low pass filter |
| 92 | magnetic body | 144b | low pass filter |
| 93 | magnetic arm | 145 | adder |
| 94 | field coil | 146 | subtracter |
| 100 | carrier position sensor | 147 | divider |
| 101 | mirror | 148 | A/D converter |
| 102 | additional light projecting unit | 200 | switch circuit |
| | | 201 | first safeguard unit |
| 103 | additional light receiving unit | 202 | second safeguard unit |
| | | 203 | third safeguard unit |
| 104 | carrier position determining unit | 204 | fourth safeguard unit |
| | | 205 | fifth safeguard unit |
| 105 | stationary carrier | 206 | sixth safeguard unit |
| 110 | beam splitter | 211 | current monitor |
| 120 | oscillator | 212 | first comparator |
| 121 | modulator | 221 | second comparator |
| 122 | projecting circuit | 231 | sensor |
| 123 | light emitting element | 232 | third comparator |
| 124 | first focusing lens | 241 | fourth comparator |
| 130 | second focusing lens | 251 | shock sensor |
| 252 | fifth comparator | 402 | drive shaft |
| 261 | sixth comparator | 403 | head pulley |
| 300 | AC power supply | 404 | take-up pulley |
| 301 | power monitor | 405 | endless belt |
| 302 | carrier catching unit | 406 | rotary encoder |
| 303 | back-up power supply | 410 | pulse train generator |
| 304 | carrier position reset unit | 411 | comparator |
| 305 | solenoid | 412 | D/A converter |
| 311 | first timer | 413 | servo amplifier |
| 312 | second timer | 500 | carrier traveling device |
| 313 | delay circuit | 501 | reversible motor |
| 320 | rugged member | 502 | drive shaft |
| 321 | catching rail | 503 | gear system |
| 322 | triangular notch | 504 | rotatable shaft |
| 323 | arm | 505 | spiral groove |
| 324 | arm | 506 | rotary encoder |
| 325 | pivot shaft | | |
| 326 | joint | 10A | voice-coil linear motor |
| 341 | third timer | 321A | catching rail |
| 342 | fourth timer | 322A | rectangular notch |
| 343 | fifth timer | 10B | voice-coil linear motor |
| 351 | solenoid housing | 75B | second differentiator |
| 352 | movable iron core | 76B | second subtracter |
| 353 | spring | 321B | catching rail |
| 400 | belt-type carrier traveling device | 322B | rubber pad |
| 401 | reversible monitor | 10C | voice-coil linear motor |
| | | 23' | light emitting element |
| 1D | optically scanning displacement detector | 43a' | discriminator |
| | | 43b' | discriminator |
| 10D | voice-coil linear motor | 50' | carrier |
| 50D | carrier | 100' | carrier position sensor |
| 55D | slider | 103' | additional light receiving unit |
| 60D | movable coil | | |
| | | 104' | carrier position determining unit |
| 50E | carrier | | |
| 55E | slider | 131' | light receiving element |
| 56E | guide rail | 143a' | discriminator |
| | | 143b' | discriminator |
| 50F | carrier | | |
| 100G | carrier position sensor | 1P | optically scanning displacement sensor |
| 102G | additional light receiving unit | | |
| | | 2P | light projecting unit |

| | | | |
|---|---|---|---|
| 103G | additional light receiving unit | 3P | light receiving unit |
| 104G | carrier position determining unit | 10P | light emitting element |
| | | 11P | first focusing lens |
| 50G | carrier | 12P | scanning mirror |
| 123G | light emitting element | 21P | second focusing lens |
| 131G | light receiving element | 22P | one-dimensional position detecting element |
| 2' | light projecting unit | | |
| 20' | oscillator | | |

What is claimed is:

1. An optically scanning displacement detector comprising:

a frame;

a light projecting means for radiating a light beam;

a beam splitter for dividing said light beam to a first light beam directed to an object to make a light spot thereon and a second light beam;

first light receiving means for directly receiving a reflected beam from said light spot to output an object position signal;

a carrier carrying said projecting means, beam splitter, and said first receiving means, said carrier being movably supported on said frame;

a position detecting means for determining a distance between said projecting means and said light spot on said object in accordance with said object position signal;

a scanning means for moving said carrier in a scanning direction to scan said light beam across said object;

a second light receiving means fixed to said frame for receiving said second light beam to generate a carrier position signal; and means for determining a position of said carrier in said scanning direction in accordance with said carrier position signal.

2. An optically scanning displacement detector as set forth in claim 1, wherein said scanning means comprises an electric motor for moving said carrier in said scanning direction.

3. An optically scanning displacement detector as set forth in claim 2, wherein said motor is a voice-coil linear motor.

4. An optically scanning displacement detector as set forth in claim 2, wherein said carrier position measuring unit comprises an encoder.

5. An optically scanning displacement detector as set forth in claim 1, wherein said motor is a linear step motor.

6. An optically scanning displacement detector as set forth in claim 5, wherein said carrier position measuring unit comprises:

means for counting a pulse number of said linear step motor; and means for determining said position of said carrier in accordance with said pulse number.

7. An optically scanning displacement detector as set forth in claim 2, wherein said detector comprises carrier catching means for catching said carrier to prevent any uncontrollable motion of said carrier when no electric current is supplied to said motor.

8. An optically scanning displacement detector as set forth in claim 7, wherein said catching means is formed with a rugged member having a plurality of triangular notches arranged in said scanning direction, and a triangular hook provided on said carrier for engagement with said notches.

9. An optically scanning displacement detector as set forth in claim 7, wherein said detector comprises means for moving said carrier from a position of said carrier caught by said catching means to a scanning starting position thereof at a first speed, said first speed being slower than a second speed, said second speed being a scanning speed, when a supply of electric current to said motor is started.

10. An optically scanning displacement detector as set forth in claim 2, wherein said detector comprises a safeguard unit for sensing unusual operation of said motor to generate a stop signal, and stopping to supply electric current to said motor in response to said stop signal.

11. An optically scanning displacement detector as set forth in claim 10, wherein said safeguard unit comprises:

means for monitoring electric current supplied to said motor;

means for generating said stop signal when a value of said current exceeds a threshold value; and means for stopping to supply said current to said motor in response to said stop signal.

12. An optically scanning displacement detector as set forth in claim 10, wherein said safeguard unit comprises:

means for monitoring electric current supplied to said motor;

means for generating said stop signal when a differential value of said current with respect to time exceeds a threshold value; and means for stopping to supply said current to said motor in response to said stop signal.

13. An optically scanning displacement detector as set forth in claim 10, wherein said safeguard unit comprises:

means for generating said stop signal when a position of said carrier provided from said carrier position measuring unit exceeds a predetermined scanning range of said carrier; and means for stopping to supply said current to said motor in response to said stop signal.

14. An optically scanning displacement detector as set forth in claim 10, wherein said safeguard unit comprises:

a shock sensor for sensing a shock applied to said carrier;

means for generating said stop signal when a value of sensor current of said sensor exceeds a threshold value; and means for stopping to supply said current to said motor in response to said stop signal.

15. An optically scanning displacement detector as set forth in claim 10, wherein said safeguard unit comprises:

a sensor for sensing a temperature of said motor;

means for generating said stop signal when a value of sensor current of said sensor exceeds a threshold value; and means for stopping to supply said current to said motor in response to said stop signal.

16. An optically scanning displacement detector as set forth in claim 10, wherein said safeguard unit comprises:

a position sensor for monitoring a position of said carrier and generating a stop signal when said carrier moves beyond a limit position; and means for stopping to supply said current to said motor in response to said stop signal.

17. An optically scanning displacement detector comprising:

a frame;

a first projecting means for directly radiating a light beam to an object to make a light spot thereon;

a first receiving means for directly receiving a reflected light beam from said light spot to output an object position signal;

a second projecting means for directly radiating a second light beam to a second receiving means, one of said second projecting means and second receiving means being fixed on said frame;

said second receiving means for receiving said second light beam to generate a carrier position signal;

a carrier carrying said first projecting means, first receiving means, and the other one of said second projecting means and second receiving means, said carrier being movably supported on said frame;

position detecting means for determining a distance between said first projecting means and said light spot on said object in accordance with said object position signal;

scanning means for moving said carrier in a scanning direction to scan said light beam across said object; and means for determining a position of said carrier in said scanning position in accordance with said carrier direction signal.

18. An optically scanning displacement detector as set forth in claim 17, wherein said scanning means comprises an electric motor for moving said carrier in said scanning direction.

19. An optically scanning displacement detector as set forth in claim 18, wherein said motor is a voice-coil linear motor.

20. An optically scanning displacement detector as set forth in claim 18, wherein said carrier position measuring unit comprises an encoder.

21. An optically scanning displacement detector as set forth in claim 18, wherein said motor is a linear step motor.

22. An optically scanning displacement detector as set forth in claim 21, wherein said carrier position measuring unit comprises:

means for counting a pulse number of said linear step motor; and means for determining said position of said carrier in accordance with said pulse number.

23. An optically scanning displacement detector as set forth in claim 18, wherein said detector comprises carrier catching means for catching said carrier to prevent any uncontrollable motion of said carrier when no electric current is supplied to said motor.

24. An optically scanning displacement detector as set forth in claim 23, wherein said catching means is formed with a rugged member having a plurality of triangular notches arranged in said scanning direction, and a triangular hook provided on said carrier for engagement with said notches.

25. An optically scanning displacement detector as set forth in claim 23, wherein said detector comprises means for moving said carrier from a position of said carrier caught by said catching means to a scanning starting position thereof at a first speed, said first speed being slower than a second speed, said second speed being a scanning speed, when a supply of electric current to said motor is started.

26. An optically scanning displacement detector as set forth in claim 18, wherein said detector comprises a safeguard unit for sensing unusual operation of said motor to generate a stop signal, and stopping to supply electric current to said motor in response to said stop signal.

27. An optically scanning displacement detector as set forth in claim 26, wherein said safeguard unit comprises:

means for monitoring electric current supplied to said motor;

means for generating said stop signal when a value of said current exceeds a threshold value; and means for stopping to supply said current to said motor in response to said stop signal.

28. An optically scanning displacement detector as set forth in claim 26, wherein said safeguard unit comprises:

means for monitoring electric current supplied to said motor;

means for generating said stop signal when a differential value of said current with respect to time exceeds a threshold value; and means for stopping to supply said current to said motor in response to said stop signal.

29. An optically scanning displacement detector as set forth in claim 26, wherein said safeguard unit comprises:

means for generating said stop signal when a position of said carrier provided from said carrier position measuring unit exceeds a predetermined scanning range of said carrier; and means for stopping to supply said current to said motor in response to said stop signal.

30. An optically scanning displacement detector as set forth in claim 26, wherein said safeguard unit comprises:

a shock sensor for sensing a shock applied to said carrier;

means for generating said stop signal when a value of sensor current of said sensor exceeds a threshold value; and means for stopping to supply said current to said motor in response to said stop signal.

31. An optically scanning displacement detector as set forth in claim 26, wherein said safeguard unit comprises:

a sensor for sensing a temperature of said motor;

means for generating said stop signal when a value of sensor current of said sensor exceeds a threshold value; and means for stopping to supply said current to said motor in response to said stop signal.

32. An optically scanning displacement detector as set forth in claim 26, wherein said safeguard unit comprises:

a position sensor for monitoring a position of said carrier and generating a stop signal when said carrier moves beyond a limit position; and means for stopping to supply said current to said motor in response to said stop signal.

33. An optically scanning displacement detector comprising:

light projecting means for directly radiating a light beam on an object to make a light spot thereon;

light receiving means for directly receiving a reflected light beam from said light spot to output an object position signal;

a carrier carrying said projecting means and receiving means, said carrier being movably supported on a frame;

a position detecting means for determining a distance between said projecting means and said light spot on said object in accordance with said position signal;

a motor for moving said carrier in a scanning direction to scan said light beam across said object;

a carrier position measuring means for determining a position of said carrier in said scanning direction;

means for inputting scanning parameters; and a control means for controlling said motor in a feed-back manner in accordance with an error found between a measured position of said carrier provided from said carrier position measuring means and a scheduled position of said carrier determined by said scanning parameters, and differential values of the first and second orders of said measured position with respect to time, to thereby provide a precise scanning operation along said scanning parameters.

34. An optically scanning displacement detector as set forth in claim 33, wherein said motor is a voice-coil linear motor.

35. An optically scanning displacement detector as set forth in claim 33, wherein said carrier position measuring unit comprises:

additional light projecting means for radiating a second light beam in a direction inclined with respect to said scanning direction;

additional light receiving means for receiving said second light beam to generate a carrier position signal; and means for determining said position of said carrier in accordance with said carrier position signal;

wherein one of said projecting means and receiving means is provided on said carrier, and the other one is provided on said frame.

36. An optically scanning displacement detector as set forth in claim 33, wherein said carrier position measuring unit comprises:

a beam splitter for dividing a second light beam from said light beam radiated from said light projecting means;

additional light receiving means provided on said frame for receiving said second light beam to generate a carrier position signal; and means for determining said position of said carrier in accordance with said carrier position signal.

37. An optically scanning displacement detector as set forth in claim 33, wherein said motor is a linear step motor.

38. An optically scanning displacement detector as set forth in claim 37, wherein said carrier position measuring unit comprises:

means for counting a pulse number of said linear step motor; and means for determining said position of said carrier in accordance with said pulse number.

39. An optically scanning displacement detector as set forth in claim 33, wherein said carrier position measuring unit comprises an encoder.

40. An optically scanning displacement detector as set forth in claim 33, wherein said detector comprises carrier catching means for catching said carrier to prevent any uncontrollable motion of said carrier when no electric current is supplied to said motor.

41. An optically scanning displacement detector as set forth in claim 40, wherein said catching means is formed with a rugged member having a plurality of triangular notches arranged in said scanning direction, and a triangular hook provided on said carrier for engagement with said notches.

42. An optically scanning displacement detector as set forth in claim 40, wherein said detector comprises means for moving said carrier from a position of said carrier caught by said catching means to a scanning starting position thereof at a first speed, said first speed being slower than a second speed, said second speed being a scanning speed, when a supply of electric current to said motor is started.

43. An optically scanning displacement detector as set forth in claim 33, wherein said carrier position measuring unit comprises:

a mirror;

additional light projecting means for radiating a second light beam in said scanning direction to said mirror;

additional light receiving means for receiving a second reflected light beam from said mirror to generate a carrier position signal; and means for determining said position of said carrier in accordance with said carrier position signal;

wherein one of said mirror and a set of said additional projecting means and additional receiving means is provided on said carrier, and the other one is provided on said frame.

44. An optically scanning displacement detector as set forth in claim 43, wherein said mirror is provided on said carrier, and said additional projecting means and additional receiving means are provided on said frame.

45. An optically scanning displacement detector as set forth in claim 33, wherein said detector comprises a safeguard unit for sensing unusual operation of said motor to generate a stop signal, and stopping to supply electric current to said motor in response to said stop signal.

46. An optically scanning displacement detector as set forth in claim 45, wherein said safeguard unit comprises:

means for monitoring electric current supplied to said motor;

means for generating said stop signal when a value of said current exceeds a threshold value; and means for stopping to supply said current to said motor in response to said stop signal.

47. An optically scanning displacement detector as set forth in claim 45, wherein said safeguard unit comprises:

means for monitoring electric current supplied to said motor;

means for generating said stop signal when a differential value of said current with respect to time exceeds a threshold value; and means for stopping to supply said current to said motor in response to said stop signal.

48. An optically scanning displacement detector as set forth in claim 45, wherein said safeguard unit comprises:

means for generating said stop signal when a value of said error exceeds a threshold value; and means for stopping to supply said current to said motor in response to said stop signal.

49. An optically scanning displacement detector as set forth in claim 45, wherein said safeguard unit comprises:

means for generating said stop signal when a position of said carrier provided from said carrier position measuring unit exceeds a predetermined scanning range of said carrier; and means for stopping to supply said current to said motor in response to said stop signal.

50. An optically scanning displacement detector as set forth in claim 45, wherein said safeguard unit comprises:

a shock sensor for sensing a shock applied to said carrier;

means for generating said stop signal when a value of sensor current of said sensor exceeds a threshold value; and means for stopping to supply said current to said motor in response to said stop signal.

51. An optically scanning displacement detector as set forth in claim 45, wherein said safeguard unit comprises:

a sensor for sensing a temperature of said motor;

means for generating said stop signal when a value of sensor current of said sensor exceeds a threshold value; and means for stopping to supply said current to said motor in response to said stop signal.

52. An optically scanning displacement detector as set forth in claim 45, wherein said safeguard unit comprises:

a position sensor for monitoring a position of said carrier and generating a stop signal when said carrier moves beyond a limit position; and means for stopping to supply said current to said motor in response to said stop signal.

* * * * *